United States Patent
Urvoy et al.

(10) Patent No.: US 12,514,643 B2
(45) Date of Patent: Jan. 6, 2026

(54) HUMERUS ANATOMICAL NECK DETECTION FOR SHOULDER REPLACEMENT PLANNING

(71) Applicant: Howmedica Osteonics Corp., Mahwah, NJ (US)

(72) Inventors: Manuel Jean-Marie Urvoy, Brest (FR); Cyrielle Violeau, Brest (FR); Julien Ogor, Brest (FR)

(73) Assignee: Howmedica Osteonics Corp., Mahwah, NJ (US)

( * ) Notice: Subject to any disclaimer, the term of this patent is extended or adjusted under 35 U.S.C. 154(b) by 328 days.

(21) Appl. No.: 18/178,270

(22) Filed: Mar. 3, 2023

(65) Prior Publication Data

US 2023/0285083 A1    Sep. 14, 2023

Related U.S. Application Data

(60) Provisional application No. 63/269,022, filed on Mar. 8, 2022.

(51) Int. Cl.
*A61B 34/10* (2016.01)
*A61F 2/46* (2006.01)
(Continued)

(52) U.S. Cl.
CPC .............. *A61B 34/10* (2016.02); *G06T 7/11* (2017.01); *G06T 7/70* (2017.01); *G06T 19/00* (2013.01);
(Continued)

(58) Field of Classification Search
None
See application file for complete search history.

(56) References Cited

U.S. PATENT DOCUMENTS 11,263,772 B2    3/2022  Siemionow et al.
11,278,413 B1    3/2022  Lang
(Continued)

FOREIGN PATENT DOCUMENTS

EP    3921837 A1    12/2021
WO    2020163358 A1   8/2020
(Continued)

OTHER PUBLICATIONS

Yang et al., "Automatic Measurement of Femoral Neck-Shaft Angle Based on CT Scan Data," 2021 16th International Conference on Intelligent Systems and Knowledge Engineering (ISKE), Chengdu, China, 2021, pp. 756-760. (Year: 2021).*

(Continued)

*Primary Examiner* — Daniel F Hajnik
*Assistant Examiner* — Jed-Justin Imperial
(74) *Attorney, Agent, or Firm* — Shumaker & Sieffert, P.A.

(57) ABSTRACT

A computing system is configured to determine a location of a humerus anatomical neck. The computing system receives a three-dimensional (3D) representation of a humerus, and applies a machine learning model to the three-dimensional representation to determine a segmentation of the 3D representation of the humerus. Based on the segmentation, the computing system determines a location of the humerus anatomical neck on the 3D representation of the humerus based on the segmentation, and generates a labeled 3D representation of the humerus that indicates the location of the humerus anatomical neck.

30 Claims, 15 Drawing Sheets

(51) Int. Cl.
  *G06T 7/11* (2017.01)
  *G06T 7/70* (2017.01)
  *G06T 19/00* (2011.01)
  *G16H 50/20* (2018.01)

(52) U.S. Cl.
  CPC ........ *G16H 50/20* (2018.01); *A61B 2034/105* (2016.02); *A61B 2034/107* (2016.02); *A61F 2/4612* (2013.01); *G06T 2207/10028* (2013.01); *G06T 2207/20081* (2013.01); *G06T 2207/20084* (2013.01); *G06T 2207/30008* (2013.01); *G06T 2210/41* (2013.01); *G06T 2210/56* (2013.01); *G06T 2219/004* (2013.01)

(56) References Cited

U.S. PATENT DOCUMENTS

| | | | |
|---|---|---|---|
| 11,432,931 | B2 | 9/2022 | Lang |
| 2006/0165268 | A1* | 7/2006 | Kaus ................. G06T 7/60 382/128 |
| 2013/0094732 | A1* | 4/2013 | Chabanas ........... G06T 7/149 382/128 |
| 2020/0138518 | A1 | 5/2020 | Lang |
| 2021/0391058 | A1 | 12/2021 | Kostrzewski et al. |
| 2022/0125515 | A1 | 4/2022 | McGuan et al. |
| 2022/0211444 | A1* | 7/2022 | Dassonville ........... A61B 34/20 |
| 2022/0233159 | A1 | 7/2022 | Yoon et al. |
| 2022/0351410 | A1 | 11/2022 | Siemionow et al. |

FOREIGN PATENT DOCUMENTS

| | | | |
|---|---|---|---|
| WO | 2022150437 | A1 | 7/2022 |
| WO | 2022183719 | A1 | 9/2022 |

OTHER PUBLICATIONS

Response to Extended Search Report dated Jul. 31, 2023, from counterpart European Application No. 23160368.9 filed Feb. 26, 2024, 15 pp.
Anonymous et al., "Human skeleton—Long bones of arms and legs", Britannica Encyclopedia, Nov. 13, 2021, 11 pp.
Dey Ayon et al., "Machine Learning Algorithm: Review", International Journal of Computer Science and Information Technologies, vol. 7, No. 3, May 3, 2016, 6 pp.
Extended Search Report from counterpart European Application No. 23160368.9 dated Jul. 31, 2023, 11 pp.
Suter Thomas et al., "Humeral head osteotomy in shoulder arthroplasty: a comparison between anterosuperior and inferoanterior resection tecchniques", vol. 26, No. 2, Oct. 6, 2016, Pages pp. 343-351.
Yang Jiayu et al., "Automatic Measurement of Femoral Neck-Shaft Angel Based on CT Scan Data", 2021 16th International Conference on Intelligent Systems and Knowledge Engineering, Nov. 26, 2021, Pages pp. 756-760.
"U-Net," wikipedia, retrieved from https://en.wikipedia.org/wiki/U-Net, last edited Sep. 8, 2022, 3 pp.
Milletari et al., "V-Net: Fully Convolutional Neural Networks for Volumetric Medical Image Segmentation," 2016 Fourth International Conference on 3D Vision (3DV), Oct. 2016, 11 pp.
Qi et al., "PointNet: Deep Learning on Point Sets for 3DClassification and Segmentation," 2017 IEEE Conference on Computer Vision and Pattern Recognition (CVPR), Jul. 2017, 4 pp.
Communication pursuant to Article 94(3) EPC from counterpart European Application No. 23160368.9 dated Jul. 11, 2025, 5 pp.
Response to Communication pursuant to Article 94(3) EPC dated Jul. 11, 2025, from counterpart European Application No. 23160368.9 filed Oct. 23, 2025, 8 pp.

* cited by examiner

● BOUNDARY POINTS ⁄233

HUMERUS ANATOMICAL NECK DETECTION FOR SHOULDER REPLACEMENT PLANNING

This application claims the benefit of U.S. Provisional Application No. 63/269,022, filed Mar. 8, 2022, the entire content of which is incorporated by reference herein.

BACKGROUND

Surgical joint repair procedures involve repair and/or replacement of a damaged or diseased joint. A surgical joint repair procedure, such as joint arthroplasty as an example, may involve replacing the damaged joint with a prosthesis that is implanted into the patient's bone. Proper selection or design of a prosthetic that is appropriately sized and shaped and proper positioning of that prosthetic are important to ensure an optimal surgical outcome. A surgeon may analyze bone structure to assist with prosthetic selection, design and/or positioning, as well as surgical steps to prepare bone or tissue to receive or interact with a prosthetic.

SUMMARY

Humerus anatomical neck (HAN) detection is an important step for shoulder replacement surgery planning (e.g., shoulder arthroplasty planning). The humerus anatomical neck is a plane separating the upper portion of the humeral head (in contact with the articulation) and the rest of the humerus. A plane indicating the location of the humerus anatomical neck is used to determine the position of the humerus head at which to cut, and thus, the position and/or sizing of a humerus prosthesis. Some techniques for determining the location of the HAN are based on mesh analysis algorithms or statistical shape modeling. Such techniques rely on predetermined models of a humerus. Because the shape of the humerus can vary widely from person to person, mesh analysis algorithms and/or statistical shape modeling techniques for determining the location of the HAN may lack desired accuracy for some anatomies, particularly those anatomies that have shapes outside those planned for by the mesh analysis algorithms and/or statistical shape modeling techniques. In some examples, mesh algorithms and statistical shape modeling may even provide undesirable results for common humerus shapes.

This disclosure describes systems and techniques for determining the location of the HAN using machine learning techniques. In one example, this disclosure describes the use of a neural network to segment the points of a representation of a humerus mesh into two categories. One category includes the points above the HAN and the other category includes the points under the HAN. Once the points are segmented, the HAN is determined as the separation plane between the two segmented categories of points.

A set of training representations of humerii may be manually annotated for use in training the neural network to segment the humerus points into those two categories. For example, if the representation of the humerus mesh is a point cloud, the point cloud training data may be manually annotated to identify points in the point cloud that are above the HAN and to identify points in the point cloud that are below the HAN. This manual annotated training data is then used to minimize a loss function between ground truth points (e.g., the manually annotated points) and predicted points from processing a non-annotated humerus representation using the neural network. In one example, the loss function is defined by a scalar product of a first mean value of the normal of ground truth points above the humerus anatomical neck and a second mean value of the normal of predicted points above the humerus anatomical neck. The results of the loss function may be used to update the parameters of the neural network in an iterative fashion.

Once trained, the neural network may be configured to segment points in a representation of a patient's humerus that are above and below the HAN. Once the segmented points are determined, a line or plane defining the HAN may be determined and visualized on the representation of the humerus. The visualized HAN may then be used for surgical planning, including planning the location of a cut line or cut plane for placing a humeral prosthesis.

In one example, this disclosure describes a computing system configured to determine a location of a humerus anatomical neck, the computing system comprising a memory configured to store parameters of a machine learning model, and one or more processors in communication with the memory. The one or more processors are configured to receive a three-dimensional (3D) representation of a humerus, and apply the machine learning model to the three-dimensional representation to determine a segmentation of the 3D representation of the humerus. The segmentation includes a first region of the 3D representation of the humerus below the humerus anatomical neck, and a second region of the 3D representation of the humerus above the humerus anatomical neck. The one or more processors are further configured to determine a location of the humerus anatomical neck on the 3D representation of the humerus based on the segmentation, and generate a labeled 3D representation of the humerus that indicates the location of the humerus anatomical neck.

In another example, this disclosure describes a method for determining a location of a humerus anatomical neck, the method comprising receiving a three-dimensional (3D) representation of a humerus, and applying a machine learning model to the three-dimensional representation to determine a segmentation of the 3D representation of the humerus, wherein the machine learning model operates according to parameters. The segmentation may include a first region of the 3D representation of the humerus below the humerus anatomical neck, and a second region of the 3D representation of the humerus above the humerus anatomical neck. The method may further include determining a location of the humerus anatomical neck on the 3D representation of the humerus based on the segmentation, and generating a labeled 3D representation of the humerus that indicates the location of the humerus anatomical neck.

In another example, this disclosure describes a non-transitory computer-readable storage medium storing instruction that, when executed, cause one or more processors to receive a three-dimensional (3D) representation of a humerus, and apply a machine learning model to the three-dimensional representation to determine a segmentation of the 3D representation of the humerus, wherein the machine learning model operates according to parameters. The segmentation may include a first region of the 3D representation of the humerus below the humerus anatomical neck, and a second region of the 3D representation of the humerus above the humerus anatomical neck. The instruction may further cause one or more processors determine a location of the humerus anatomical neck on the 3D representation of the humerus based on the segmentation, and generate a labeled 3D representation of the humerus that indicates the location of the humerus anatomical neck.

The details of various examples of the disclosure are set forth in the accompanying drawings and the description below. Various features, objects, and advantages will be apparent from the description, drawings, and claims.

DETAILED DESCRIPTION

Figure 1:
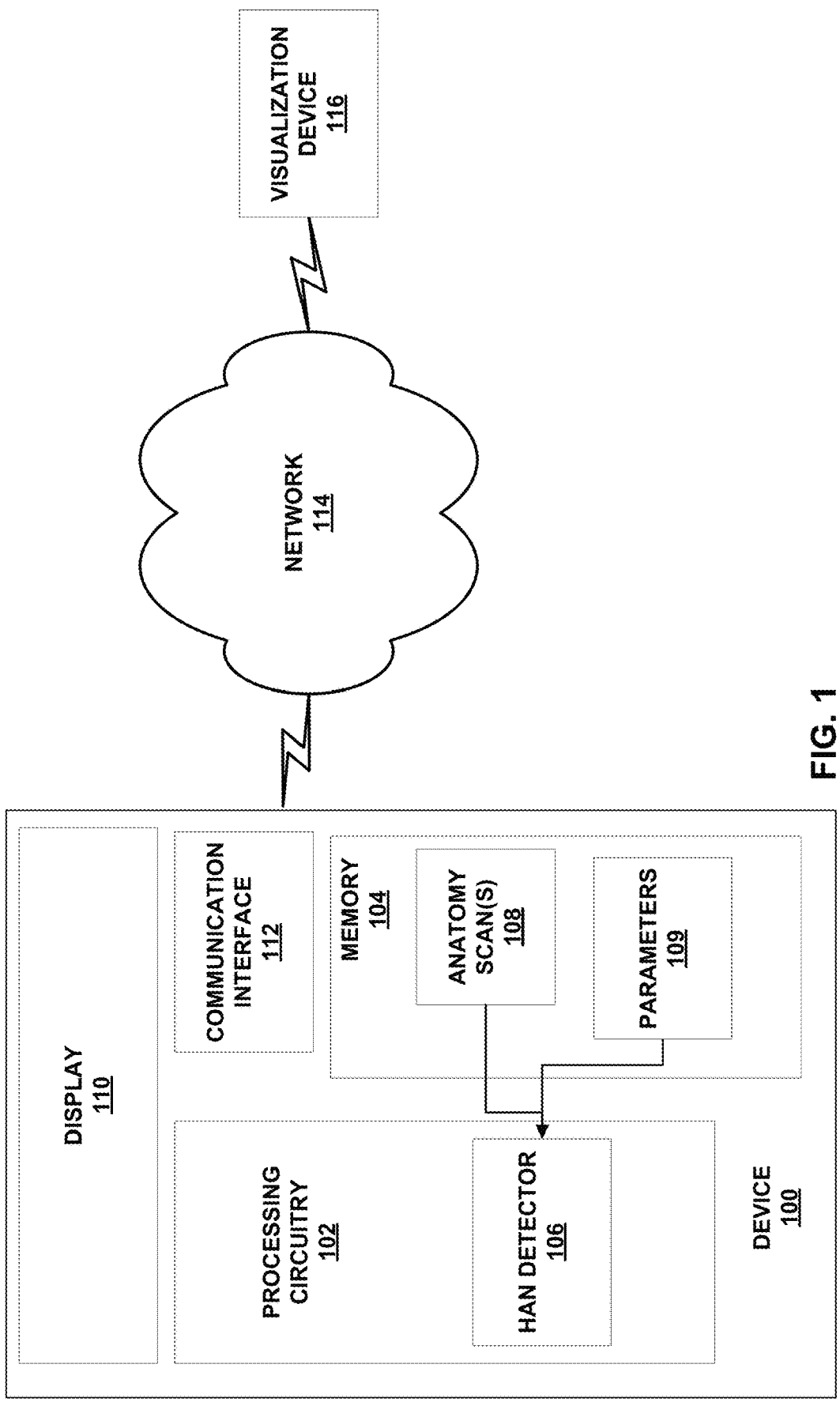
FIG. 1 is a block diagram illustrating an example computing device that may be used to implement the techniques of this disclosure for detecting a humerus anatomical neck.

A patient may suffer from a disease (e.g., aliment) or injury that causes damage to the patient anatomy. For shoulders, as an example of patient disease or injury, a patient may suffer from primary glenoid humeral osteoarthritis (PGHOA), rotator cuff tear arthropathy (RCTA), instability, massive rotator cuff tear (MRCT), rheumatoid arthritis (RA), post-traumatic arthritis (PTA), osteoarthritis (OA), or acute fracture, as a few examples.

To address the disease or injury, a surgeon may perform a surgical procedure such as Reversed Arthroplasty (RA), Augmented Reverse Arthroplasty, Standard Total Shoulder Arthroplasty (TA), Augmented Total Shoulder Arthroplasty, or Hemispherical shoulder surgery, Shoulder Hemiarthroplasty as a few examples. There may be benefits for the surgeon to determine, prior to the surgery, characteristics (e.g., size, shape, and/or location) of the patient anatomy. For instance, determining the characteristics of the patient anatomy may aid in prosthetic selection, design and/or positioning, as well as planning of surgical steps to prepare a surface of the bone to receive or interact with a prosthetic. With advance planning, the surgeon can determine, prior to surgery, rather than during surgery, steps to prepare bone or tissue, tools that will be needed, sizes and shapes of the tools, the sizes and shapes or other characteristics of one or more prostheses that will be implanted and the like.

Humerus anatomical neck (HAN) detection is an important step for shoulder replacement surgery planning (e.g., shoulder arthroplasty planning). The humerus anatomical neck is a plane separating the upper portion of the humeral head (in contact with the articulation) and the rest of the humerus. A plane indicating the location of the humerus anatomical neck is used to determine the position of the humerus head at which to cut, and thus, the position and/or sizing of a humerus prosthesis. Existing techniques for determining the location of the HAN are based on mesh analysis algorithms or statistical shape modeling. Such techniques rely on predetermined models of a humerus. Because the shape of the humerus can vary widely from person to person, mesh analysis algorithms and/or statistical shape modeling techniques for determining the location of the HAN may lack the desired accuracy for some anatomies, particularly those anatomies that have shapes outside those planned for by the mesh analysis algorithms and/or statistical shape modeling techniques. In some examples, mesh algorithms and statistical shape modeling may even provide undesirable results for common humerus shapes.

This disclosure describes systems and techniques for determining the location of the HAN using machine learning techniques. The machine learning techniques of this disclosure may improve the accuracy of HAN detection over previous techniques. In one example, this disclosure describes the use of a neural network to segment the points of a representation of a humerus mesh into two categories. One category includes the points above the HAN and the other category includes the points under the HAN. Once the points are segmented, the HAN is determined as the separation plane between the two segmented categories of points.

A set of training representations of humerii may be manually annotated for use in training the neural network to segment the humerus points into those two categories. For example, if the representation of the humerus mesh is a point cloud, the point cloud training data may be manually annotated to identify points in the point cloud that are above the HAN and to identify points in the point cloud that are below the HAN. This manual annotated training data is then used to minimize a loss function between ground truth points (e.g., the manually annotated points) and predicted points from processing training humerus representations using the neural network. In one example, the loss function is defined by a scalar product of a first mean value of normals of ground truth points above the humerus anatomical neck and a second mean value of normals of predicted points above the humerus anatomical neck. The results of the loss function may be used to update the parameters of the neural network in an iterative fashion.

Once trained, the neural network may be configured to segment points in a representation of a patient's humerus that are above and below the HAN. Once the segmented points are determined, a line defining the HAN may be determined and visualized on the representation of the humerus. The visualized HAN may then be used for surgical planning, including planning the location of a cut line for placing a humeral prosthesis. Other examples include use of the visualized HAN to plan drill, screw, or anchor points, e.g., for placement of humeral prostheses, or creation and/or placement of guides for cutting or reaming, or the like.

In one example, this disclosure describes a computing system configured to determine a location of a humerus anatomical neck, the computing system comprising a memory configured to store parameters of a machine learning model, and one or more processors in communication with the memory. The one or more processors are configured to receive a three-dimensional (3D) representation of a humerus, and apply the machine learning model to the three-dimensional representation to determine a segmentation of the 3D representation of the humerus. The segmentation includes a first region of the 3D representation of the humerus below the humerus anatomical neck, and a second region of the 3D representation of the humerus above the humerus anatomical neck. The one or more processors are further configured to determine a location of the humerus anatomical neck on the 3D representation of the humerus based on the segmentation, and generate a labeled 3D representation of the humerus that indicates the location of the humerus anatomical neck.

FIG. 1 is a block diagram illustrating an example computing device that may be used to implement the techniques of this disclosure. FIG. 1 illustrates device 100, which is an example of a computing device configured to perform one or more example techniques for humerus anatomical neck detection and visualization described in this disclosure.

Device 100 may include various types of computing devices, such as server computers, personal computers, smartphones, laptop computers, and other types of computing devices. Device 100 includes processing circuitry 102, memory 104, and display 110. Display 110 is optional, such as in examples where device 100 is a server computer.

Examples of processing circuitry 102 include one or more microprocessors, digital signal processors (DSPs), application specific integrated circuits (ASICs), field programmable gate arrays (FPGAs), discrete logic, software, hardware, firmware or any combinations thereof. In general, processing circuitry 102 may be implemented as fixed-function circuits, programmable circuits, or a combination thereof. Fixed-function circuits refer to circuits that provide particular functionality and are preset on the operations that can be performed. Programmable circuits refer to circuits that can programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Figure 2:
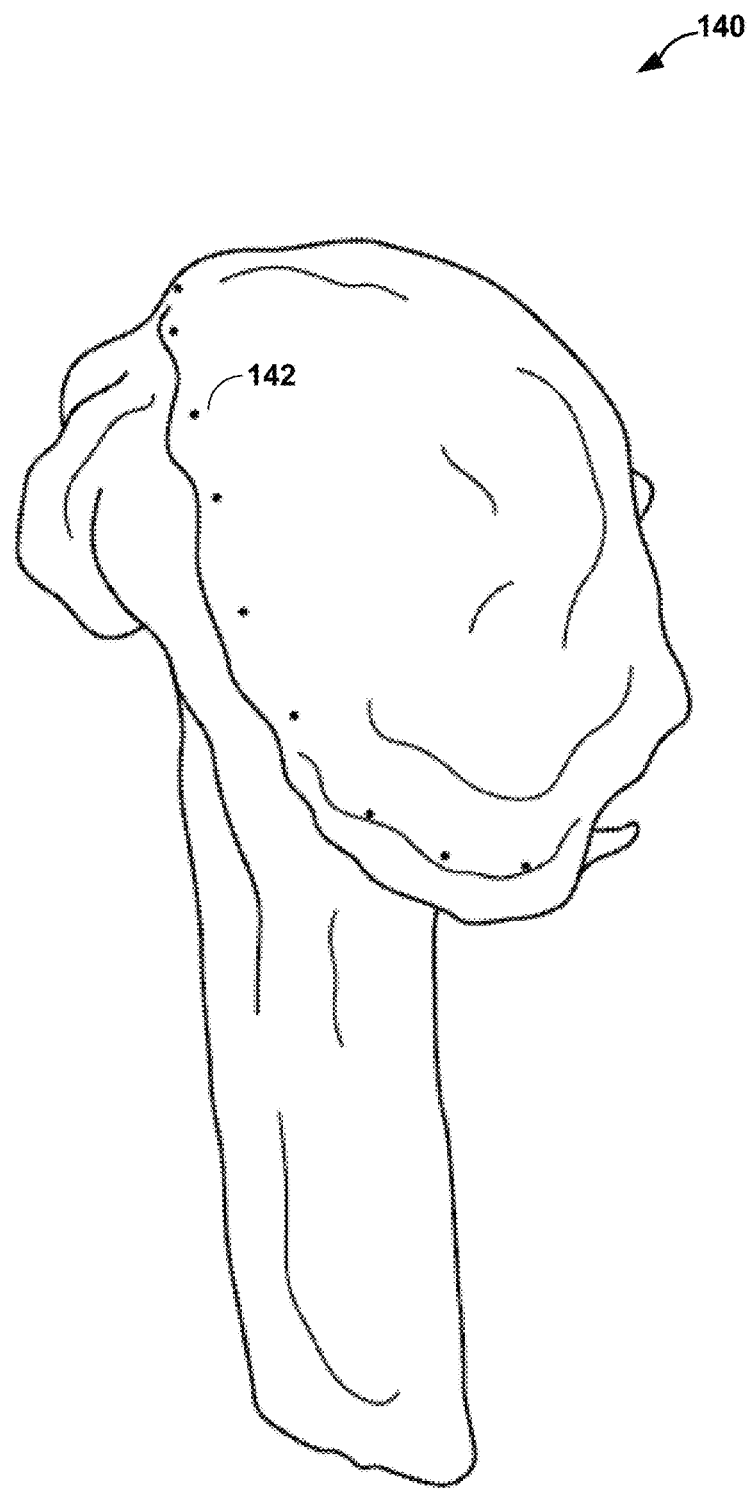
FIG. 2 shows an example 3D representation of a humerus.

Processing circuitry 102 may include arithmetic logic units (ALUs), elementary function units (EFUs), digital circuits, analog circuits, and/or programmable cores, formed from programmable circuits. In examples where the operations of processing circuitry 102 are performed using software executed by the programmable circuits, memory 104 may store the object code of the software that processing circuitry 102 receives and executes, or another memory within processing circuitry 102 (not shown) may store such instructions. Examples of the software include software designed for surgical planning. As will be explained in more detail below, processing circuitry 102 may include a HAN detector 106 that is configured to determine the location of a humerus anatomical neck in a representation of a humerus. FIG. 2 shows an example 3D representation 140 of a humerus. 3D representation is marked with dots 142 generally showing the location the humerus anatomical neck.

In some examples, HAN detector 106 may be configured to execute a neural network or other machine learning algorithm that is configured to identify points above and below a humerus anatomical neck in a representation of a humerus. The representation of the humerus may be generated from anatomy scan(s) 108. HAN detector 106 106 may execute a neural network that operates according to parameters 109. Parameters 109 may include output functions and/or weights for one or more stages of a neural network.

Memory 104 may be formed by any of a variety of memory devices, such as dynamic random access memory (DRAM), including synchronous DRAM (SDRAM), magnetoresistive RAM (MRAM), resistive RAM (RRAM), or other types of memory devices. Examples of display 110 include a liquid crystal display (LCD), a plasma display, an organic light emitting diode (OLED) display, or another type of display device.

Device 100 may include communication interface 112 that allows device 100 to output data and instructions to and receive data and instructions from visualization device 116 via network 114. For example, after the determining the location of humerus anatomical neck, using techniques described in this disclosure, communication interface 112 may output information indicating the location of the humerus anatomical neck on a representation of a humerus to visualization device 116 via network 114. A surgeon may then view a graphical representation of the humerus with the identified humerus anatomical neck with visualization device 116 (e.g., possibly with a suggested surgical cut line overlaid in the representation of the humerus).

Communication interface 112 may be hardware circuitry that enables device 100 to communicate (e.g., wirelessly or using wires) to other computing systems and devices, such as visualization device 116. Network 114 may include various types of communication networks including one or more wide-area networks, such as the Internet, local area networks, and so on. In some examples, network 114 may include wired and/or wireless communication links.

Visualization device 116 may utilize various visualization techniques to display image content to a surgeon. Visualization device 116 may be a computer display, an augmented reality (AR) visualization device, mixed reality (MR) visualization device, virtual reality (VR) visualization device, holographic projector, or other device for presenting extended reality (XR) visualizations. In some examples, visualization device 116 may be a Microsoft HOLOLENS™ headset, available from Microsoft Corporation, of Redmond, Washington, USA, or a similar device, such as, for example, a similar MR visualization device that includes waveguides. The HOLOLENS™ device can be used to present 3D virtual objects via holographic lenses, or waveguides, while permitting a user to view actual objects in a real-world scene, i.e., in a real-world environment, through the holographic lenses.

Visualization device 116 may utilize visualization tools that are available to utilize patient image data to generate three-dimensional models of bone contours to facilitate preoperative planning for joint repairs and replacements. These tools allow surgeons to design and/or select surgical guides and implant components that closely match the patient's anatomy. These tools can improve surgical outcomes by customizing a surgical plan for each patient. An example of such a visualization tool for shoulder repairs is the BLUEPRINT™ system available from Stryker Corporation. The BLUEPRINT™ system provides the surgeon with two-dimensional planar views of the bone repair region as well as a three-dimensional virtual model of the repair region. The surgeon can use the BLUEPRINT™ system to select, design or modify appropriate implant components, determine how best to position and orient the implant components and how to shape the surface of the bone to receive the components, and design, select or modify surgical guide tool(s) or instruments to carry out the surgical plan. The information generated by the BLUEPRINT™ system is compiled in a preoperative surgical plan for the patient that is stored in a database at an appropriate location (e.g., on a server in a wide area network, a local area network, or a global network) where the plan can be accessed by the surgeon or other care provider, including before and during the actual surgery.

As illustrated, memory 104 stores parameters 109, which are parameters used by HAN detector 106 to perform 3D image and/or point cloud segmentation. Memory 104 may also store data representative of anatomy scans 108. Anatomy scans 108 are examples of computed tomography (CT) scans of a patient, e.g., as represented by CT scan image data.

A CT scan combines series of X-ray images taken from different angles and uses computer processing to create cross-sectional images, or slices, of the bones, blood vessels, and soft tissues inside a body. A CT Scan has many uses, but is particularly well-suited to quickly examine people who may have internal injuries, such as fractured bones, from car accidents or other types of trauma. A CT-Scan can be used to visualize nearly all parts of the body and is used to diagnose disease or injury as well as to plan medical, surgical or radiation treatment.

An output of a CT-Scan is a volumetric image composed of elementary cubes (i.e. voxels), where each voxel is associated with a numerical value that represents an X-Ray attenuation measured at the corresponding 3-D position. This value is typically transformed into the Hounsfeld unit (HU) scale. The HU scale is a linear transformation of the original linear attenuation coefficient measurement into one in which the radiodensity of distilled water at standard pressure and temperature (STP) is defined as zero HU, while the radiodensity of air at STP is defined as −1000 HU. High HU values of 400 and above correspond to materials with high density such as bone, while low HU values correspond to low-density materials such as fat (e.g., −100 to −50 HU), muscle (+10 to +40 HU), blood (+30 to +45 HU), etc. For the purpose of computer visualization the HU values may be mapped to gray scale intensities.

Anatomy scans 108 may be sufficient to reconstruct a three-dimensional (3D) representation of the anatomy of the patient, such as a 3D representation of the humerus. That is, the anatomy scans may be automatically segmented to produce a 3D representation of the humerus. The 3D representation may be a point cloud, a 3D binary image, or other representation. One example way of automated segmentation is described in U.S. Pat. No. 8,971,606. There may be various other ways in which to perform automated segmentation, and the techniques are not limited to automated segmentation using techniques described in U.S. Pat. No. 8,971,606. As one example, segmentation of the CT image data to yield segmented objects includes comparisons of voxel intensity in the image data to determine bony anatomy and comparisons to estimated sizes of bony anatomy to determine a segmented object. Moreover, the example techniques may be performed with non-automated segmentation techniques, where a medical professional evaluates the CT image data to segment anatomical objects, or some combination of automation and user input for segmenting anatomical objects.

In one or more examples, anatomy scans 108 may be scans of anatomy that is pathological due to injury or disease. The patient may have an injured shoulder requiring surgery, such as a shoulder replacement surgery. A surgeon may have requested anatomy scans 108 to plan the surgery. A computing device (like device 100 or some other device) may generate segmentations of the patient anatomy so that the surgeon can view anatomical objects (e.g., the humerus) and the size, shape, and interconnection of the objects with other anatomy of the patient anatomy needing surgery.

In one or more examples, processing circuitry 102, executing HAN detector 106, may further segment a 3D representations of a humerus from anatomy scans 108 to locate and define the humerus anatomical neck. As will be explained in more detail below, HAN detector 106 may be configured to receive a three-dimensional (3D) representation of a humerus, and apply a machine learning model to the three-dimensional representation to determine a segmentation of the 3D representation of the humerus. The segmentation includes a first region of the 3D representation of the humerus below the humerus anatomical neck, and a second region of the 3D representation of the humerus above the humerus anatomical neck. HAN detector 106 may be further configured to determine a location of the humerus anatomical neck on the 3D representation of the humerus based on the segmentation, and generate a labeled 3D representation of the humerus that indicates the location of the humerus anatomical neck.

Figure 3:
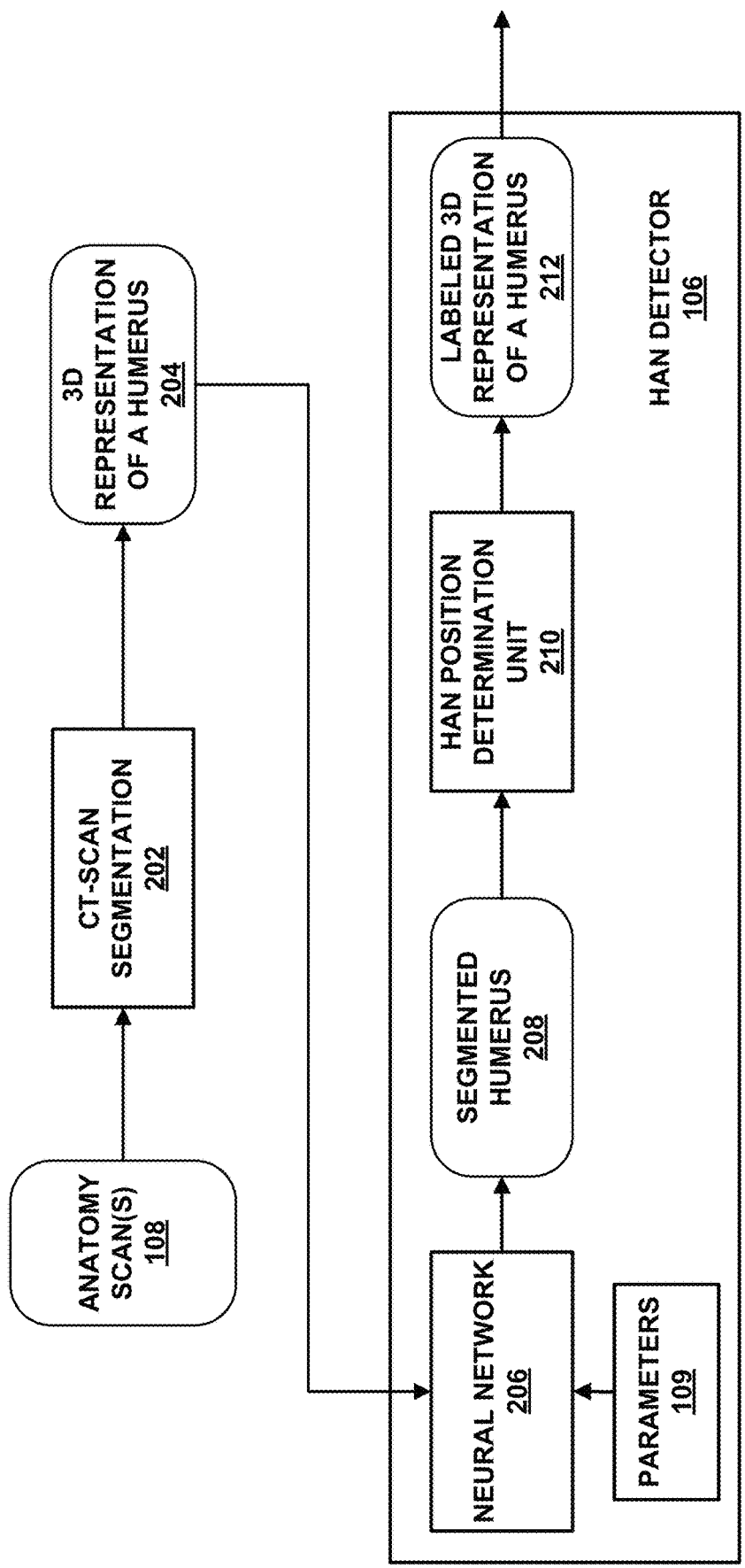
FIG. 3 is a block diagram showing an example process flow according to the techniques of this disclosure for detecting a humerus anatomical neck.

FIG. 3 is a block diagram showing an example process flow according to the techniques of this disclosure for detecting a humerus anatomical neck. Initially, device 100, or another computing device, may receive anatomy scan(s) 108. As described above, anatomy scan(s) 108 may be CT-scans or other medical imaging scans that showing patient anatomy, including the humerus. Device 100, or another computing device, may execute CT-scan segmentation process 202 on the anatomy scan(s) 108 to generate a 3D representation of a humerus 204. In one example of the disclosure, the 3D representation of a humerus 204 may be a point cloud. A point cloud is a set of points in 3D space that define the shape of an object. Each point of the point cloud may be represented by a set of coordinates in 3D space. In some examples, each point of a point cloud may also be associated with other attributes, such as color and/or reflectance. In some examples, reflectance may be used as a measure of the solidity of any object being detected by the mechanism that produced the point cloud (e.g., the CT scanning device). In some examples, point clouds may be divided into a plurality of cubic regions called voxels. Each voxel may have zero, one, or a plurality of points.

In other examples, the 3D representation of a humerus 204 may be a 3D image. The 3D image may comprise 3D pixels (e.g., voxels) of the humerus at positions in a 3D coordinate space. In some examples, the 3D image is a 3D binary image, meaning that each of the voxel values may be one of two colors: black or white. The black voxels may be used to indicate locations in the 3D image that are the humerus, while white voxels may be used to indicate 3D locations in the 3D image that are not the humerus.

HAN detector 106 may receive the 3D representation of a humerus 204 and apply a machine learning model (e.g., neural network 206) to the 3D representation of a humerus 204 to determine a segmentation of the 3D representation of the humerus (e.g., segmented humerus 208). In one example, as will be described below, the segmentation includes a first region of the 3D representation of a humerus 204 below the humerus anatomical neck, and a second region of the 3D representation of a humerus 204 above the humerus anatomical neck.

In some examples, neural network 206 may be one or more artificial neural networks (ANNs), including deep neural networks (DNNs) and/or convolutional neural networks (CNNs). In general, neural networks have shown great promise as classification tools. Neural network 206 may include an input layer, an output layer, and one or more hidden layers between the input layer and the output layer. Neural network 206 may also include one or more other types of layers, such as pooling layers.

Each layer may include a set of artificial neurons, which are frequently referred to simply as "neurons." Each neuron in the input layer receives an input value from an input vector. Outputs of the neurons in the input layer are provided as inputs to a next layer in the network. Each neuron of a layer after the input layer may apply a propagation function to the output of one or more neurons of the previous layer to generate an input value to the neuron. The neuron may then apply an activation function to the input to compute an activation value. The neuron may then apply an output function to the activation value to generate an output value for the neuron. An output vector of the network includes the output values of the output layer of the network.

This disclosure describes techniques that may resolve the challenges of accurately segmenting a humerus to identify an humerus anatomical neck and provide an neural network structure that provides meaningful output regarding shoulder pathology. For example, an neural network (ANN), such as a CNN, has an input layer, an output layer, and one or more hidden layers between the input layer and the output layer. The input layer includes a plurality of input layer neurons. Each input layer neuron in the plurality of input layer neurons corresponds to a different input element in a plurality of input elements. The output layer includes a plurality of output layer neurons.

Each output layer neuron in the plurality of output layer neurons corresponds to a different output element in a plurality of output elements. Each output element in the plurality of output elements corresponds to a different classification. In the example of this disclosure, the classifications may be points identified as being above the humerus anatomical neck, and points identified as being below the humerus anatomical neck. In this example, a computing system, such as device 100 may receive a plurality of training datasets that include annotated 3D representations of a humerus. The annotated representations may include points that are manually identified as being above or below the humerus anatomical neck. Each respective training dataset corresponds to a different training data patient in a plurality of training data patients and comprises a respective training input vector and a respective target output vector.

For each respective training dataset, the training input vector of the respective training dataset comprises a value for each element of the plurality of input elements. For each respective training dataset, the target output vector of the respective training dataset comprises a value for each element of the plurality of output elements. In this example, the computing system may use the plurality of training datasets to train neural network 206. As will be explained in more detail below, training neural network 206 may include determining parameters 109 of neural network 206 by minimizing a loss function. Parameters 109 may include weights applied to the output layers of neural network 206 and/or output functions for the layers of neural network 206. In one example, the loss function is defined by a scalar product of a first mean value of normals of ground truth points (e.g., points in the annotated training data) above the humerus anatomical neck and a second mean value of normals of predicted points (e.g., points classified by neural network 206) above the humerus anatomical neck.

In one example, the 3D representation of a humerus 204 is a point cloud. In one example, to process point cloud data, neural network 206 may be a neural network with a plurality of layers configured to classify (e.g., segment) three-dimensional point cloud input data. One example of such a neural network is PointNet. PointNet, or other similarly configured convolutional neural networks, may have a fully connected network structure using one or more pooling layers (e.g., global or local pooling layers). Convolutional neural networks convolve the input of a layer and pass the result to the next layer. A network structure has fully connected layers if every neuron in one layer is connected to every neuron in another layer. A network with fully connected layers may also be called a multi-layer perceptron neural network (MLP).

In some examples, a pooling layer reduces the dimensions of data by combining the outputs of neurons at one layer into a single neuron in the next layer. Local pooling combines small data clusters. Global pooling involves all the neurons of the network. Two common types of pooling include max pooling and average pooling. As one example, PointNet uses max pooling. Max pooling uses the maximum value of each local cluster of neurons in the network.

In some examples, each neuron in neural network 206 computes an output value by applying a specific function to the input values received from the previous layer. The function that is applied to the input values is determined by a vector of weights and bias. The weights and bias for neural network 206 may be included in parameters 109. As will be explained below, training neural network 206 may include iteratively adjusting these biases and weights. The vector of weights and the bias are sometimes called filters and represent particular features of the input. In this example, the particular features of the input are points of the humerus that are above and below the humerus anatomical neck.

Neural network 206 is effectively trained to learn a set of optimization functions that determine points on a 3D representation of a humerus that are above or below a humerus anatomical neck. Network 206 may encode an output that indicates a reason for the determination of whether a particular point is above or below the humerus anatomical neck. In one example, fully connected layers of neural network 206 aggregate learned optimal values into a descriptor that is used to predict per point labels (i.e., labelling points as being above or below a humerus anatomical neck). In one example, neural network 206 is configured as a classification network that takes n points as input, applies input and feature transformations, and then aggregates point features by max pooling.

In another example, the 3D representation of a humerus 204 is a 3D binary. In this example, to process the 3D image, neural network 206 may be a neural network with a plurality of layers configured to classify (e.g., segment) three-dimensional image (e.g., voxels) input data. In this example, neural network 206 may be a convolutional neural network, such as Vnet or Unet. Neural network 206 may be trained and operated similarly to what is described above, adjusting for a different input structure (e.g., images vs. point clouds). That is, when the 3D representation of a humerus 204 is a point cloud, neural network 206 is configured to determine a segmentation (e.g., segmented humerus 208) including a first set of points in the point cloud below the humerus anatomical neck and a second set of points in the point cloud above the humerus anatomical neck. When the 3D representation of a humerus 204 is a 3D binary image, neural network 206 is configured to determine a segmentation (e.g., segmented humerus 208) including a first set of voxels in the 3D binary image below the humerus anatomical neck and a second set of voxels in the 3D binary image above the humerus anatomical neck.

After neural network 206 generates segmented humerus 208, HAN detector 106 may be further configured to determine the position of the humerus anatomical neck for the segmented humerus 208. For example, HAN position determination unit 210 may apply a fitting algorithm to the points in segmented humerus 208 to determine a plane that indicates the position of the humerus anatomical neck. HAN position determination unit 210 may further determine a cut location for a shoulder replacement surgery based on the plane through the humerus anatomical neck. The cut location may be different based on what type of shoulder surgery is being planned (e.g., the shoulder replacement surgery is an anatomical shoulder arthroplasty or a reverse shoulder arthroplasty).

Figure 4:
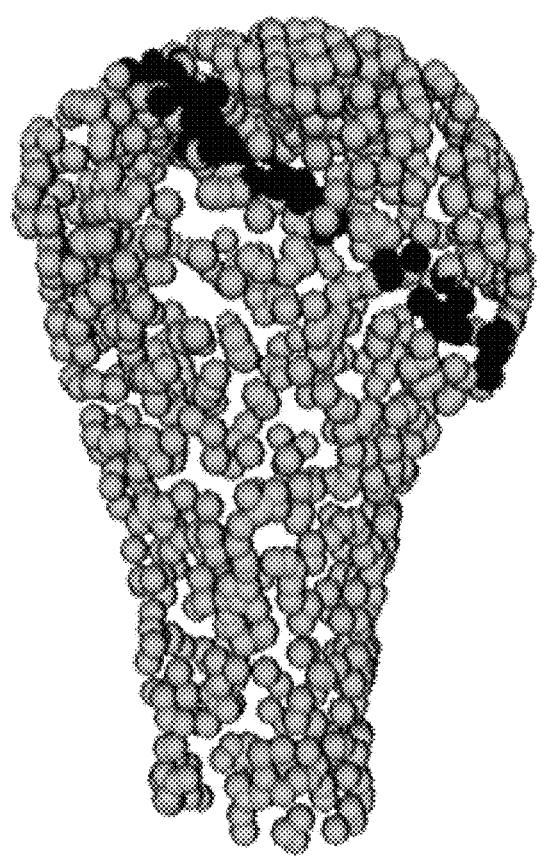
FIG. 4 shows example boundary points used to fit a plane through the humerus anatomical neck.

FIG. 4 shows example boundary points used to fit a plane through the humerus anatomical neck. As shown in FIG. 4, HAN position determination unit 210 may determine boundary points 233 from the segmented humerus. The boundary points may be defined as segmented points above and below the HAN that are closest to each other. For example, HAN position determination unit 210 may determine a distance between one or more points determined to be above the HAN and one or more points determined to be below the HAN. HAN position determination unit 210 may then select points that are nearest each other and label these points as boundary points 233 (see FIG. 4). For example, HAN position determination unit 210 may label points as boundary points 233 if the distance between the point above the HAN and the nearest point below the HAN is less than or equal to some threshold distance. Once boundary points 233 are determined, HAN position determination unit 210 may fit a plane through the determined boundary points 233.

Figure 5:
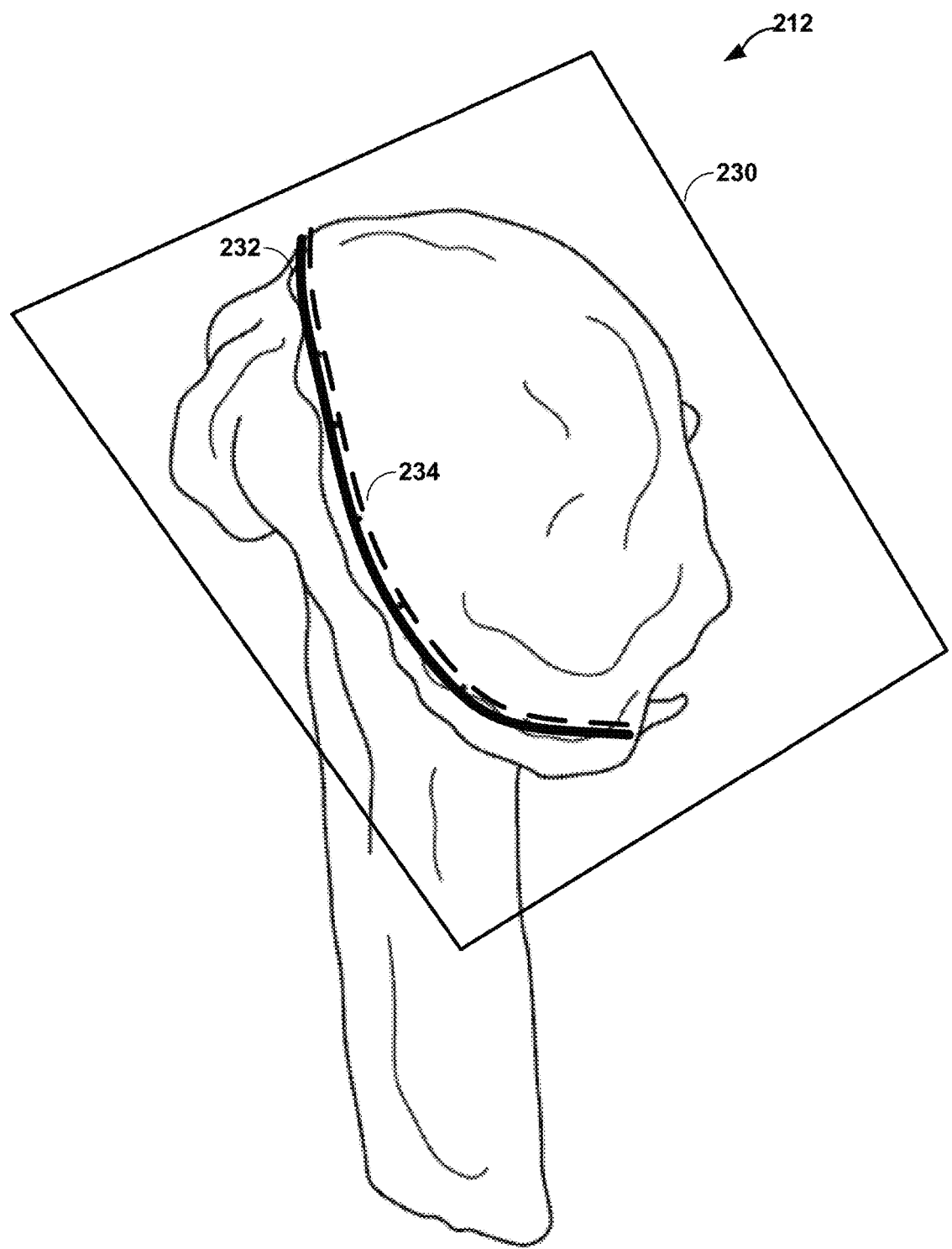
FIG. 5 shows an example of a 3D representation of a humerus with a labeled humerus anatomical neck.

HAN position determination unit 210 may annotate and output a labeled 3D representation of a humerus 212. The labeled 3D representation of a humerus 212 may include visual indications that show the humerus anatomical neck with the cut location. FIG. 5 shows an example of a 3D representation of a humerus with a labeled humerus anatomical neck. In FIG. 5, labeled 3D representation of a humerus 212 may include a plane 230 indicating the location of the humerus anatomical neck. In some examples, labeled 3D representation of a humerus 212 may further include solid line 232 that shows the humerus anatomical neck overlaid on the 3D representation of the humerus. In other examples, labeled 3D representation of a humerus 212 may further include a dashed line 234 that shows a proposed location of a cut for a shoulder prosthesis. Device 100 may display labeled 3D representation of a humerus 212 on display 110 and/or visualization device 116, as described above. Again, in one example, visualization device 116 may be one of a mixed reality (MR) visualization device, a virtual reality (VR) visualization device, a holographic projector, or an extended reality (XR) visualization device.

Figure 6:
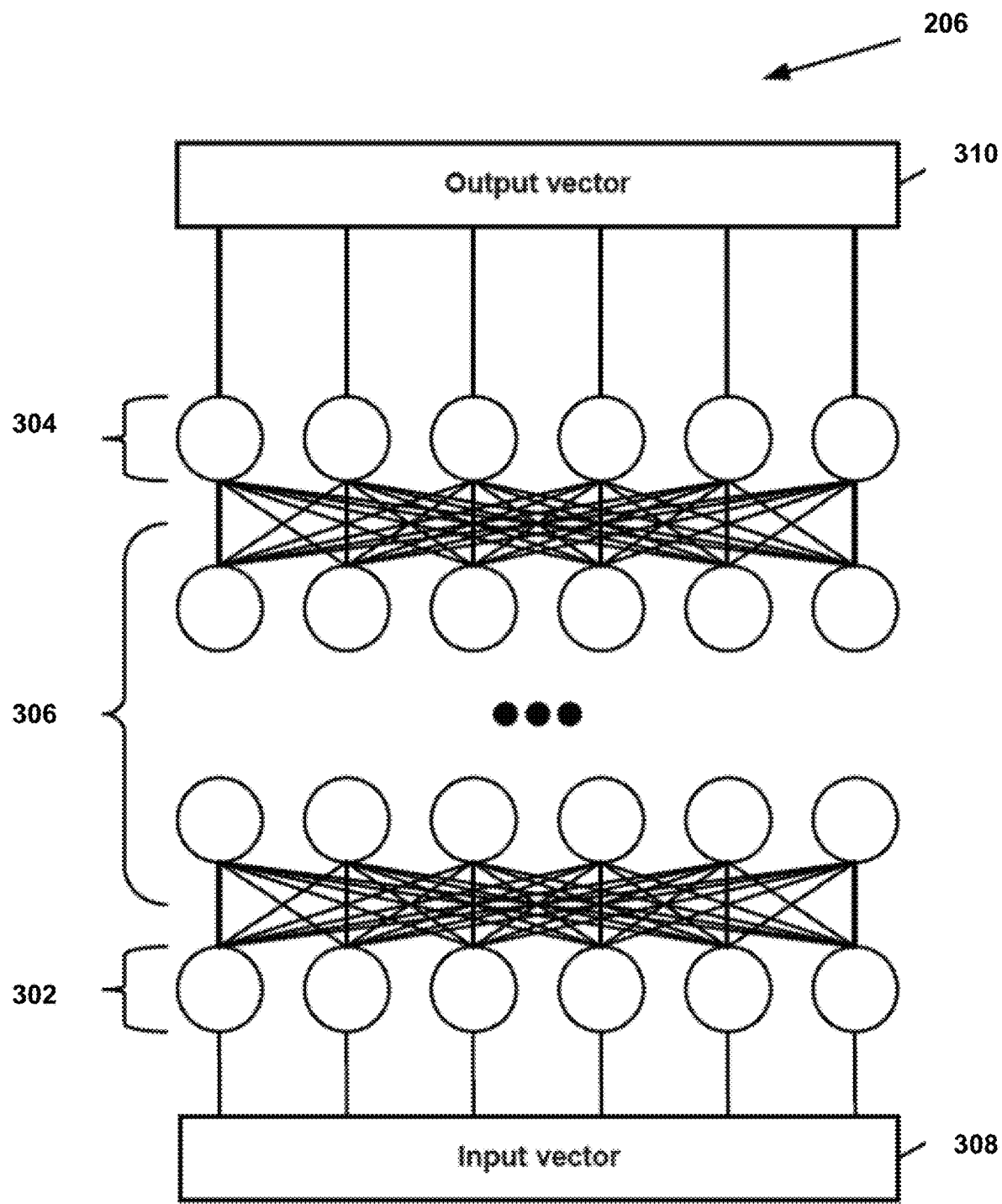
FIG. 6 is block diagram showing an example neural network configured to perform the techniques of this disclosure for detecting a humerus anatomical neck.

FIG. 6 is block diagram showing an example neural network configured to perform the techniques of this disclosure for detecting a humerus anatomical neck. FIG. 6 illustrates an example neural network 206 that may be implemented by device 100 of FIG. 1. In the example of FIG. 6, neural network 206 includes an input layer 302, an output layer 304, and one or more hidden layers 306 between input layer 302 and output layer 304. In the example of FIG. 6, neurons are represented as circles. Although each layer is shown as including six neurons, layers in neural network 206 may include more or fewer neurons. Furthermore, although neural network 206 is shown in FIG. 6 as being a fully connected network, neural network 206 may have a different architecture. For instance neural network 206 may not be a fully connected network, may have one or more convolutional layers, or may otherwise have a different architecture from that shown in FIG. 6.

In some implementations, neural network 206 can be or may include one or more artificial neural networks (also referred to simply as neural networks). A neural network can include a group of connected nodes, which also can be referred to as neurons or perceptrons. A neural network can be organized into one or more layers. Neural networks that include multiple layers can be referred to as "deep" networks. A deep network can include an input layer, an output layer, and one or more hidden layers positioned between the input layer and the output layer. The nodes of the neural network can be connected or non-fully connected.

Neural network 206 can be or may include one or more feed forward neural networks. In feed forward networks, the connections between nodes do not form a cycle. For example, each connection can connect a node from an earlier layer to a node from a later layer.

In some instances, neural network 206 can be or may include one or more recurrent neural networks. In some instances, at least some of the nodes of a recurrent neural network can form a cycle. Recurrent neural networks can be especially useful for processing input data that is sequential in nature. In particular, in some instances, a recurrent neural network can pass or retain information from a previous portion of the input data sequence to a subsequent portion of the input data sequence through the use of recurrent or directed cyclical node connections.

In some implementations, neural network 206 can be or may include one or more convolutional neural networks. In some instances, a convolutional neural network can include one or more convolutional layers that perform convolutions over input data using learned filters. Filters can also be referred to as kernels. Convolutional neural networks can be especially useful for vision problems such as when the input data includes imagery such as still images or video.

Neural network 206 may be or include one or more other forms of artificial neural networks such as, for example, deep Boltzmann machines; deep belief networks; stacked autoencoders; etc. Any of the neural networks described herein can be combined (e.g., stacked) to form more complex networks.

In the example of FIG. 6, an input vector 308 includes a plurality of input elements. Each of the input elements may be a numerical value. In this example, the input vector may be points of a point cloud of a humerus. Input layer 302 includes a plurality of input layer neurons. Each input layer neuron in the plurality of input layer neurons included in input layer 302 may correspond to a different input element in a plurality of input elements. In other words, input layer 302 may include a different neuron for each input element in input vector 308.

Furthermore, in the example of FIG. 6, an output vector 310 includes a plurality of output elements. Each of the output elements may be a numerical value. In this example, the output elements may be an indication of whether a point is above or below a humerus anatomical neck. Output layer 304 includes a plurality of output layer neurons. Each output layer neuron in the plurality of output layer neurons corresponds to a different output element in the plurality of output elements. In other words, each output layer neuron in output layer 304 corresponds to a different output element in output vector 310.

Figure 7:
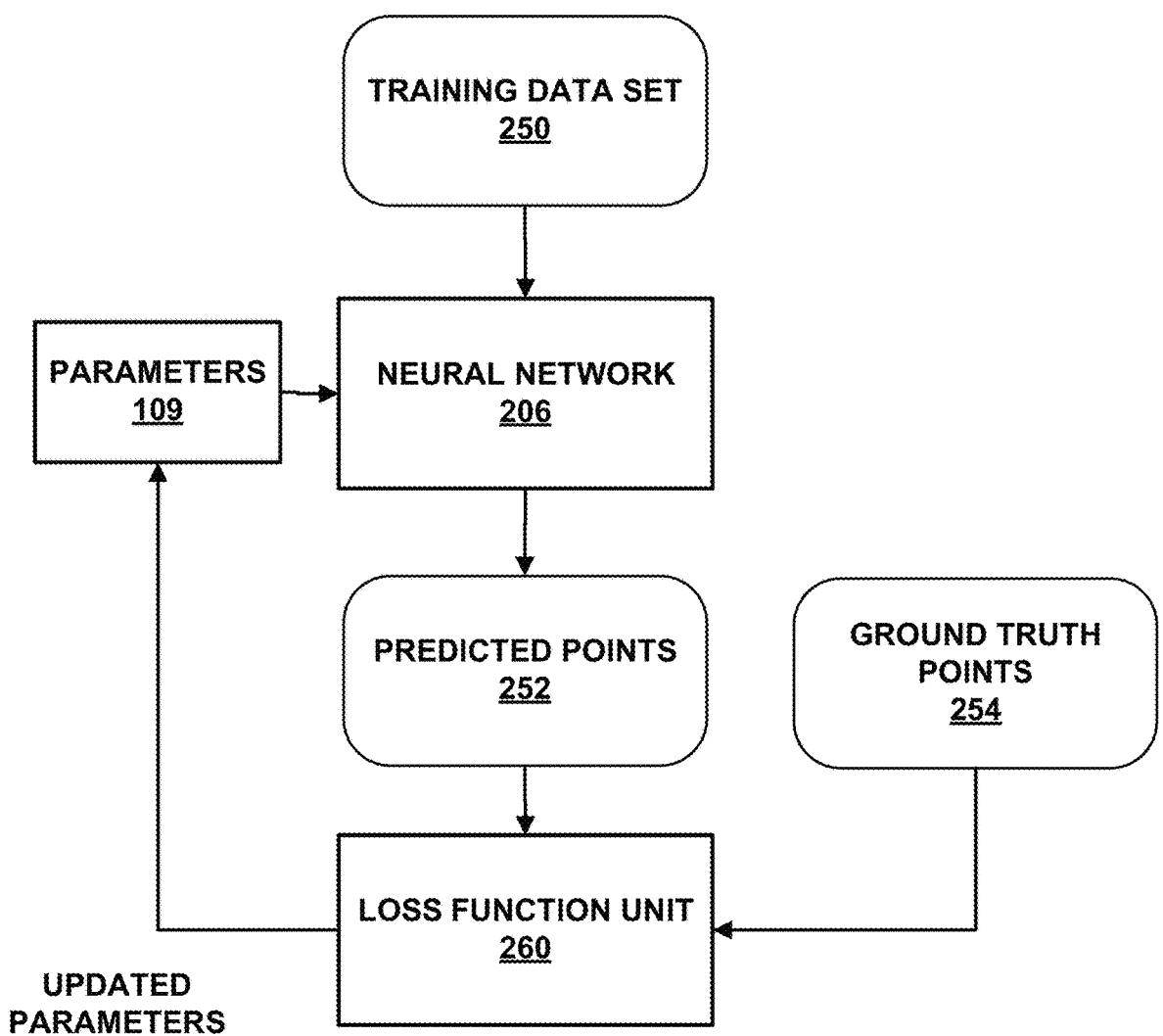
FIG. 7 is a block diagram showing an example process for training a neural network according to the techniques of this disclosure.
Figure 8:
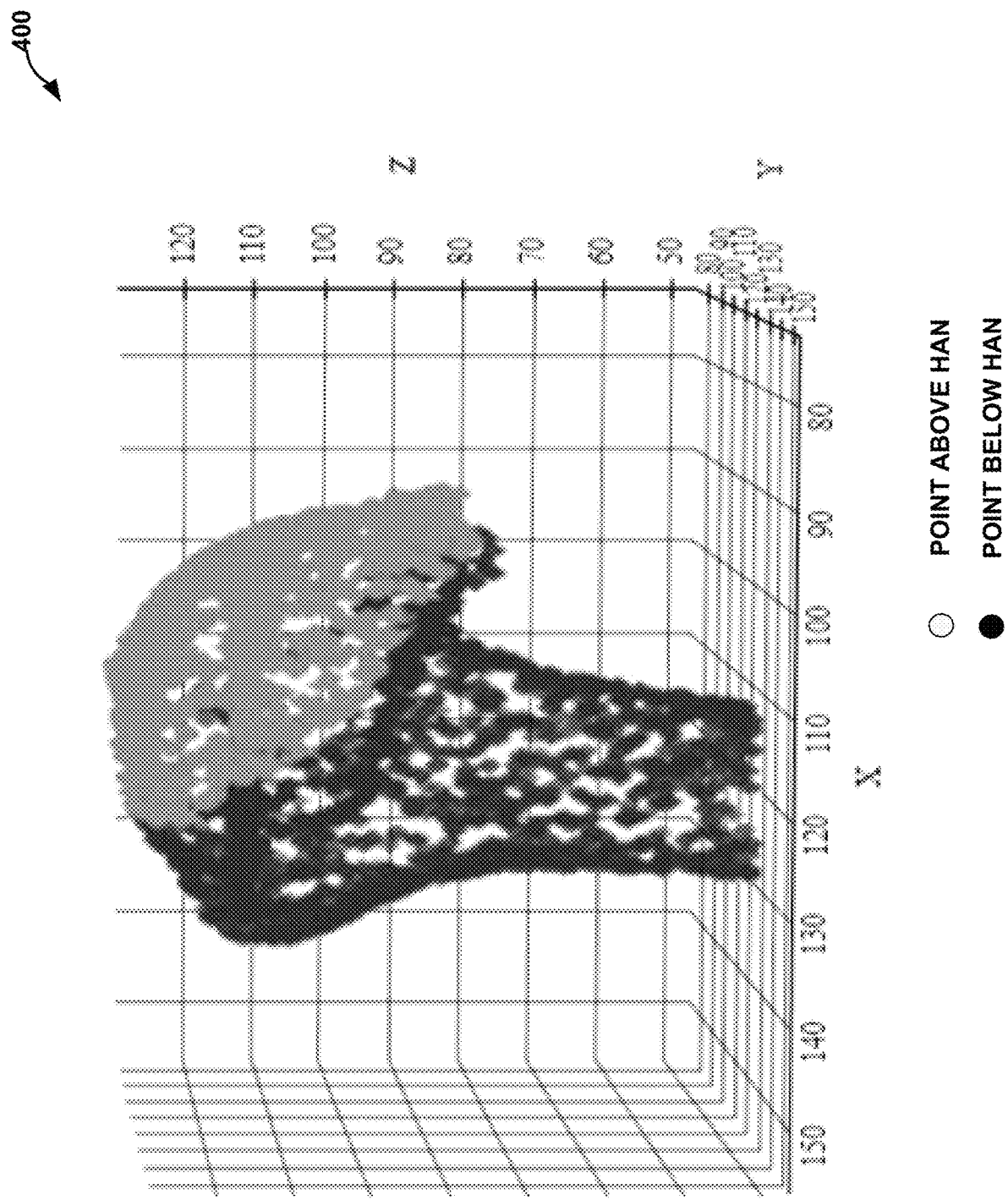
FIG. 8 shows an example annotated point cloud of a humerus.

FIG. 7 is a block diagram showing an example process for training a neural network according to the techniques of this disclosure. In FIG. 6, neural network 206 may be configured to process training data set 250 as an input. Training data set 250 may be a set of point clouds of a plurality of different humerii. Testing has shown that good training results can be received from 1000 different humerii. However, more or fewer training point clouds (or 3D images) may be used based on the accuracy desired. Ground truth points 254 is the annotated version of training data set 250, where the points or voxels of the training data set are labeled such that each point of the humerus is manually labeled as being either above or below the humerus anatomical neck. FIG. 8 shows an example annotated point cloud of a humerus. In FIG. 8, the annotated humerus 400 is annotated with gray points above the humerus anatomical neck and black points below the humerus anatomical neck.

Neural network 206 processes training data set 250 to produced predicted points 252. Predicted points 252 includes point clouds or 3D images that are segmented by neural network 206 to identify points or voxels in the training data set that are predicted to be above or below the humerus anatomical neck. Loss function unit 260 may then compare each of the predicted points 252 with their corresponding ground truth points 254 to effectively determine the accuracy of the neural network 206. The output of the loss function is then used to determine updated parameters (e.g., weights of each output layer of neural network 206). These updated parameters replace the weights of parameters 109. The training process may be iteratively performed, and the parameters may be iteratively updated, over many instances of the training data set (e.g., called epochs) until a desired accuracy is achieved. That is, the training data set is fixed, but the same training date set may be entirely used again for each training iteration.

Each neural network training data set comprises a plurality of data pairs, each data pair being made of the raw data plus expected labels. If the training data set includes humerus meshes, the raw data is the humerus point cloud, and the expected labels are the segmentation labels (above HAN/below HAN) associated to each point of the raw point cloud. If the training data set is 3D images, the expected labels may be a 3D binary mask made of two labels to identify voxels above and below the HAN. In this case, the raw data could be either the original CT 3D image of the humerus (e.g., in grey level), or the output of a humerus auto segmentation (e.g., 3D binary mask with a single label to identify humerus voxels).

For some example feedforward neural networks, the process of updating the parameters is called backpropagation. When training neural network 206, loss function unit 260 may compute a gradient of a loss function with respect to the weights (e.g., parameters 109) of neural network 206 for a single input—output example. Loss function unit 260 may perform a backpropagation algorithm that includes computing a gradient of the loss function with respect to each weight by a chain rule, computing the gradient one layer at a time, and iterating backward from the last layer to avoid redundant calculations of intermediate terms in the chain rule.

In general, loss function unit 260 performs backpropagation by computing a gradient in weight space of a feedforward neural network (e.g., neural network 206), with respect to a loss function. The input is a vector of features (e.g., a points or voxels of a 3D representation of the humerus), and the target output is a segmentation of such features. For segmentation, the output will be a vector of probabilities that a particular point or voxel is above the humerus anatomical neck or below the humerus anatomical neck.

For segmentation, the last layer of neural network 206 is a logic faction that outputs a binary classification (e.g., above or below the humerus anatomical neck). The training set for backpropagation includes set of input-output pairs. For each input-output pair in the training set, the loss of the model on that pair is the cost of the difference between the predicted output (e.g., predicted points 252) and the target output (ground truth points 254).

In order to configure neural network 206 to more accurately identify a humerus anatomical neck in a 3D representation of a humerus, the loss function employed by loss function unit 260 is defined by a scalar product of a first mean value of normals of ground truth points above the humerus anatomical neck and a second mean value of normals of predicted points above the humerus anatomical neck.

For example, the loss function (Loss) may be defined as Loss=a cos (N_gt*N_pred), where a cos is an inverse cosine function that computes an angle from the scalar product of N_gt and N_pred. N_gt is a mean value of normals of ground truth points above the humerus anatomical neck in an annotated training 3D representation of the humerus (e.g., ground truth points 254). N_pred is a mean value of normals of predicted points above the humerus anatomical neck in a non-annotated 3D representation of the humerus (predicted points 252 resulting from processing training data set 250).

More generally:

N_gt=mean(n_gt)=sum(n_gt$_i$)/n where n=total number of points in the upper part of the anatomical neck;

N_pred=mean(n_pred)=sum(n_pred$_i$)/n where n=total number of points in the upper part of the anatomical neck; and Loss=angle(N_gt,N_pred)

The angle function above is defined by the a cos of the scalar product of the two mean vectors: Loss=acos (N_gt·N_pred). The scalar product of the two vectors is defined by the sum of the product term by term of the two vectors (u·v=$x_u x_v + y_u y_v + z_u z_v$).

In other examples, loss function unit 260 may be configured to minimize two or more loss functions. For example, in addition to the loss function defined above, loss function 260 may also be configured to minimize a cross entropy loss. In one example, the cross entropy loss (L) may be defined by the following equation:

$$L = l(x, y) = \sum_{n=1}^{N} \frac{l_n}{\sum_{n=1}^{N} w_{yi}},$$

where $$l_n = -w_{yn} \log \frac{\exp(x_n, y_n)}{\sum_{C=1}^{C} \exp(x_n, c)},$$

and where x is the input (e.g., the predicted points), y is the target (e.g., the ground truth points), w is the weight, C is the number of classes (e.g., two in this example of above or below the HAN), and N spans the minibatch dimension (e.g., the number of point clouds or 3D images in training data set 250).

Figure 9:
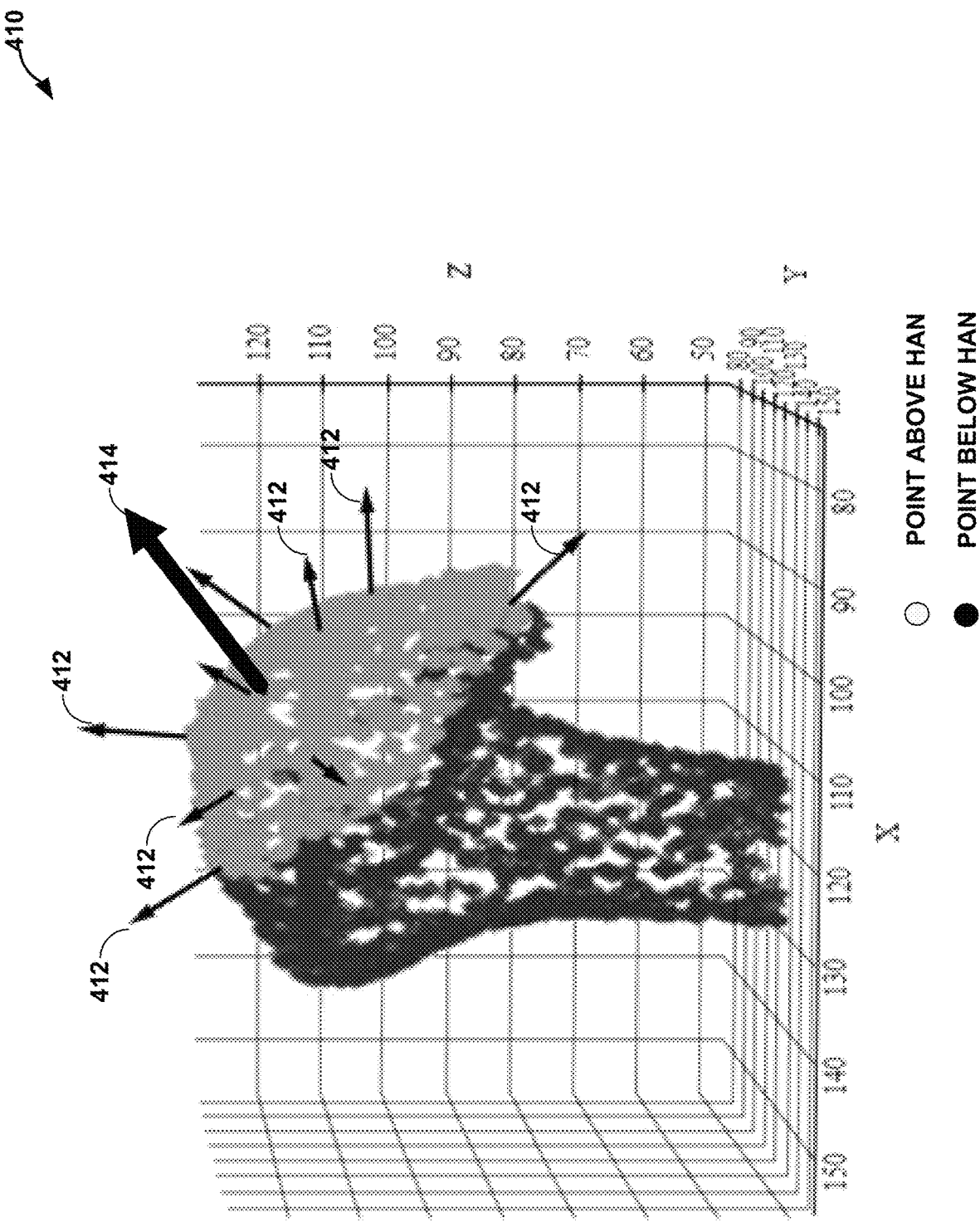
FIG. 9 shows an example predicted point cloud of a humerus with a visualized mean normal computation.

FIG. 9 shows an example predicted point cloud of a humerus with a visualized mean normal computation. In particular, FIG. 9 shows a predicted humerus 410 with labeled points generated by neural network, overlaid with arrows illustrating loss function values. Smaller arrows 412 represent the normals (e.g., angles computed by the loss function) for some points from the upper part of the humerus anatomical neck, and the larger arrow 414 represents the mean values of all the normals.

Figure 10:
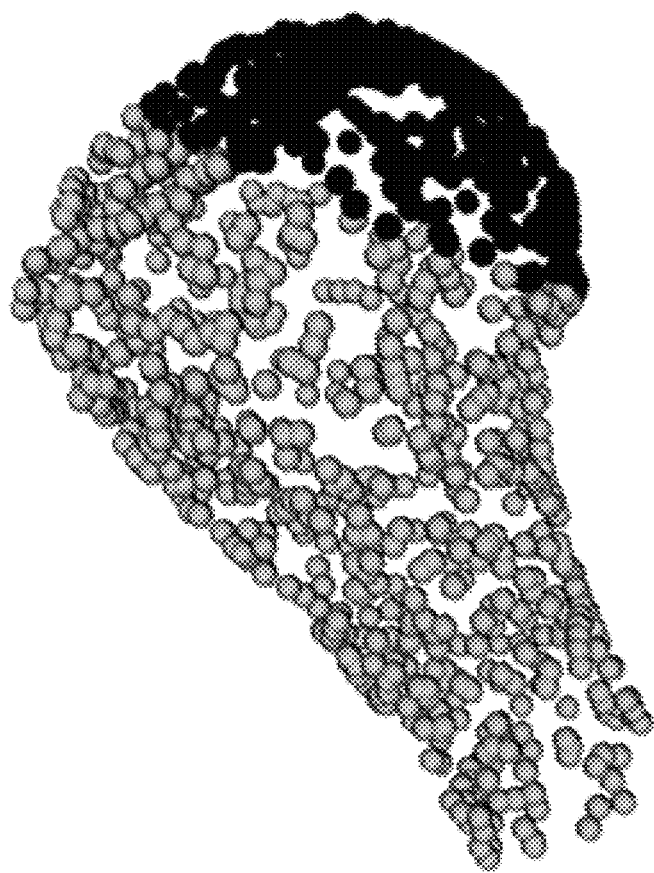
FIG. 10 shows an example view of ground truth points of an annotated point cloud of a humerus.
Figure 11:
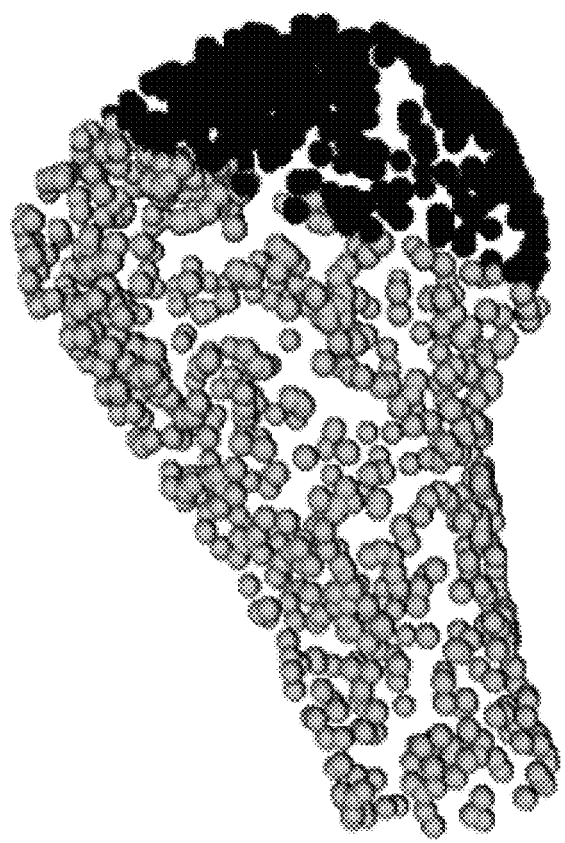
FIG. 11 shows an example view of predicted points of an annotated point cloud of a humerus.
Figure 12:
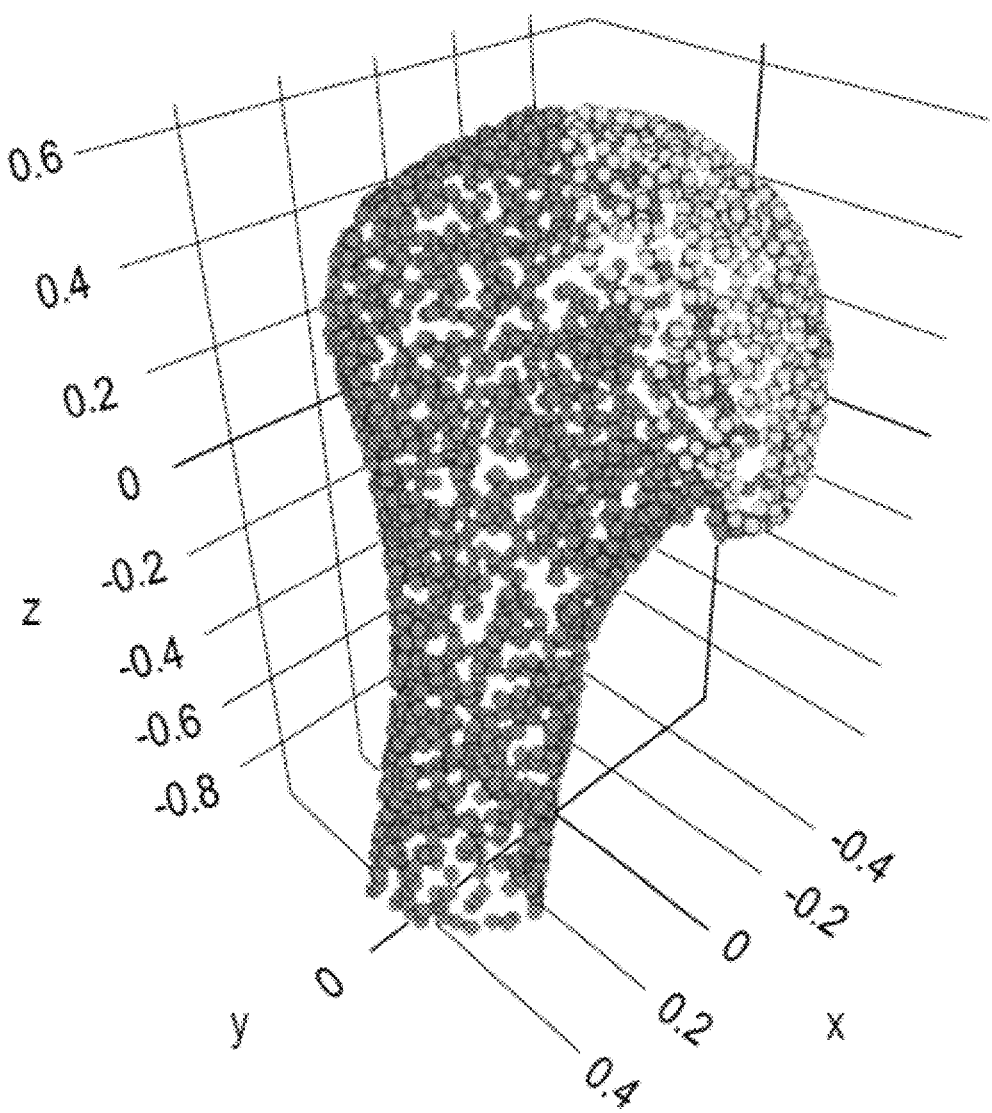
FIG. 12 shows another example view of ground truth points of an annotated point cloud of a humerus.
Figure 13:
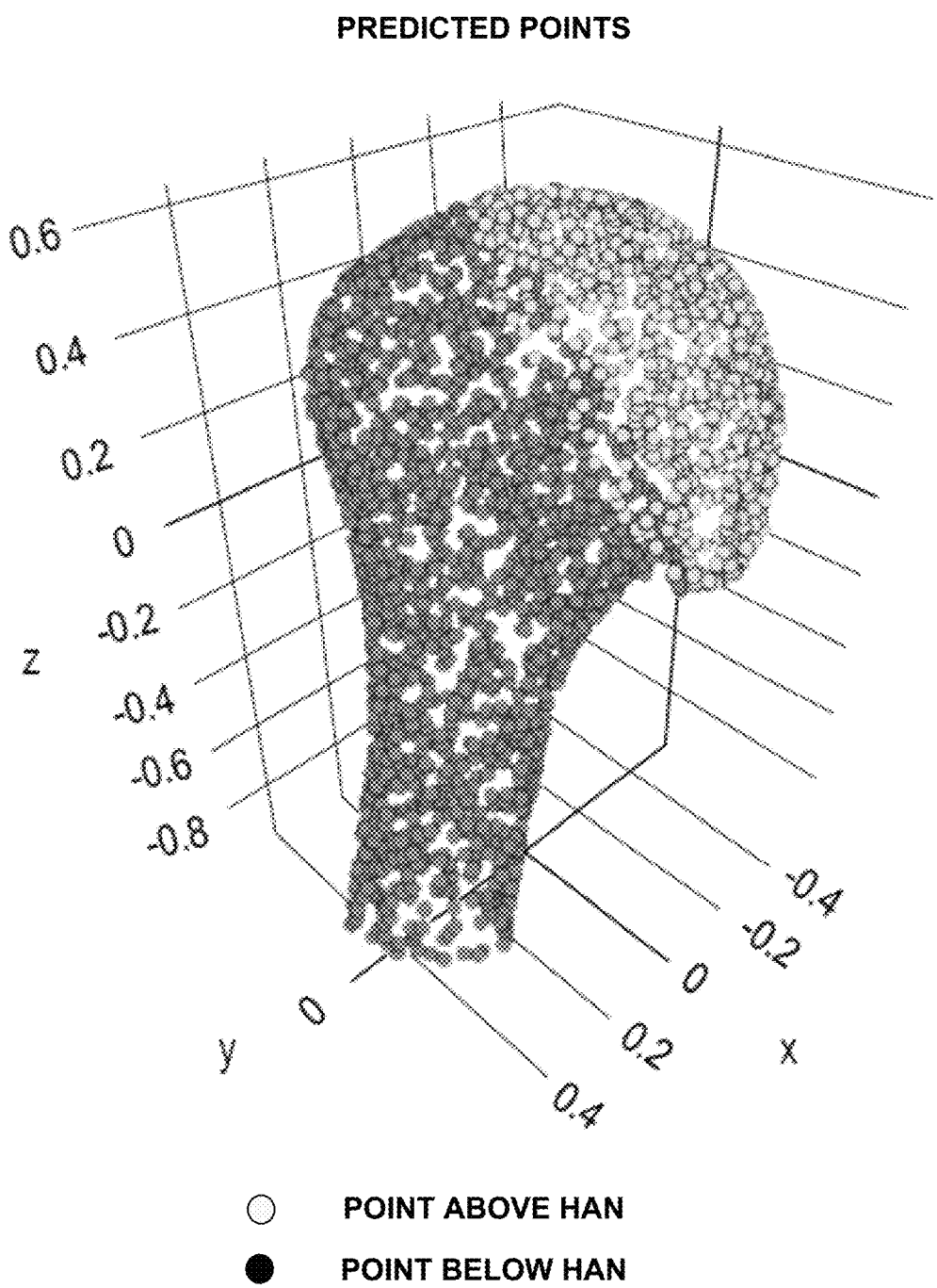
FIG. 13 shows another example view of predicted points of an annotated point cloud of a humerus.

FIGS. 10-13 illustrate other examples of annotated and predicted points clouds of a humerus at different angles. FIG. 10 shows an example view of ground truth points of an annotated point cloud of a humerus. FIG. 11 shows an example view of predicted points of an annotated point cloud of a humerus. FIG. 12 shows another example view of ground truth points of an annotated point cloud of a humerus. FIG. 13 shows another example view of predicted points of an annotated point cloud of a humerus.

Figure 14:
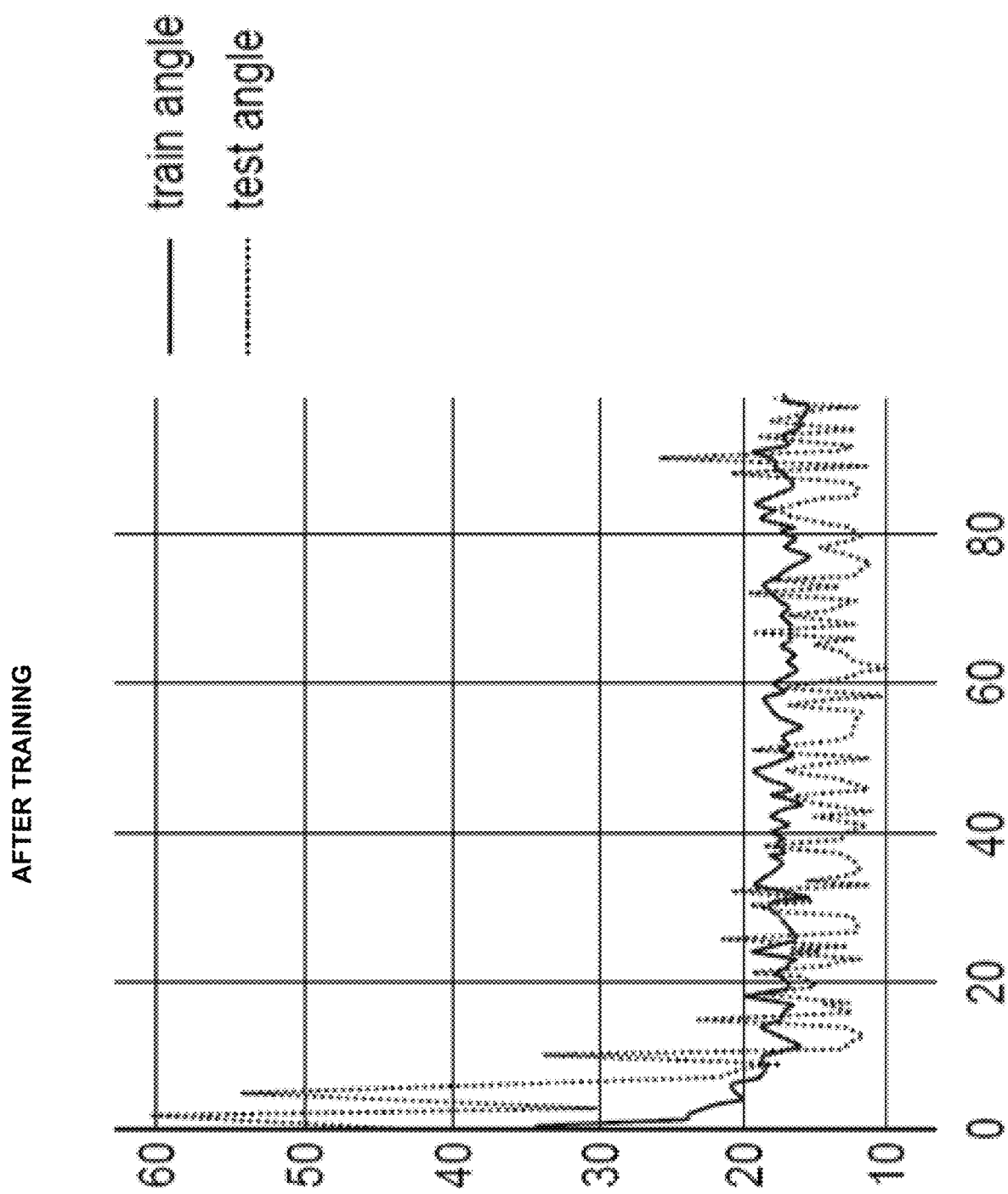
FIG. 14 is an example graph of loss function angles after training.

FIG. 14 is an example graph of loss function for training (train angle) and testing sets (test angle) during the training.

Figure 15:
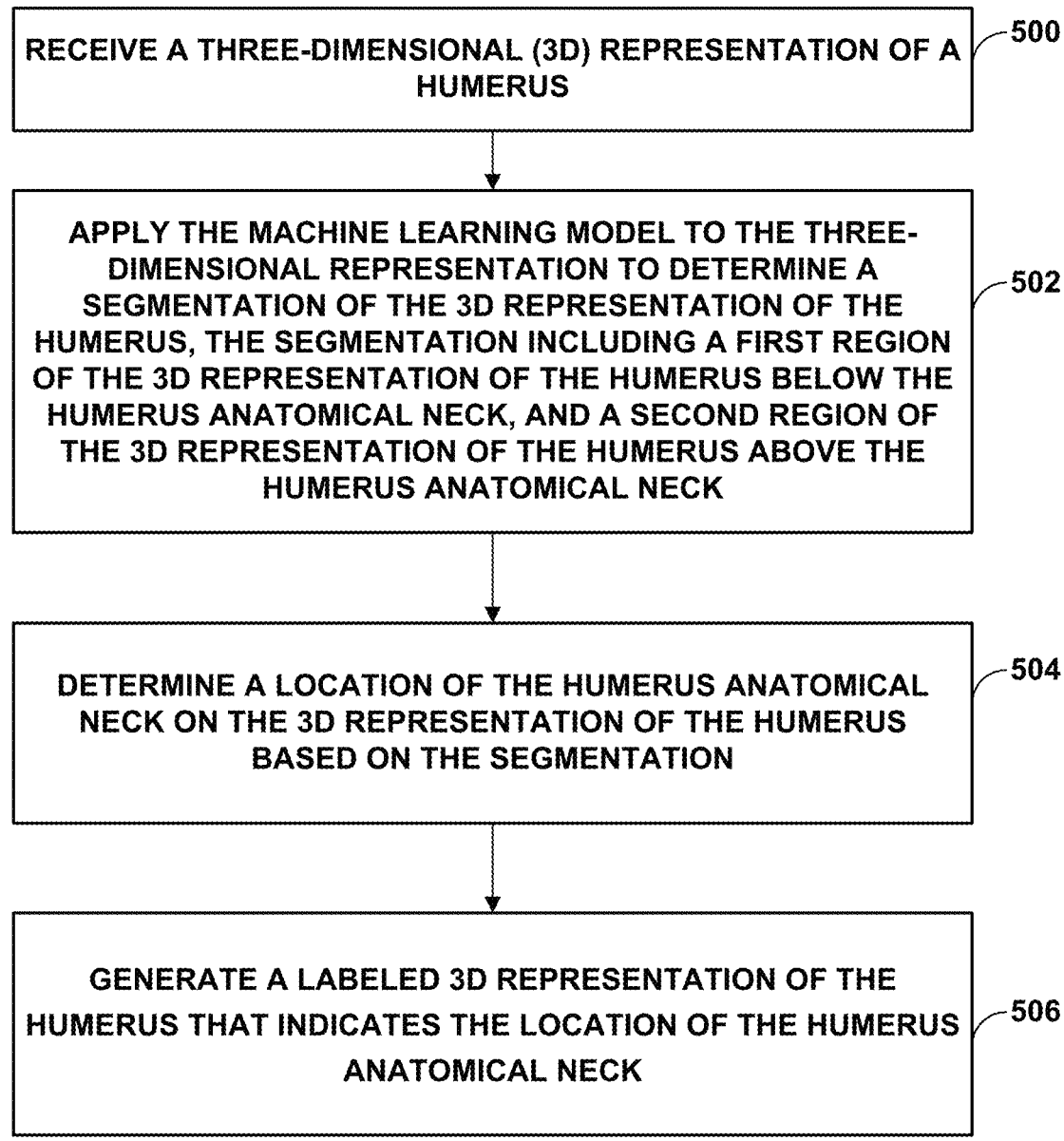
FIG. 15 is a flowchart showing an example method of the disclosure for detecting a humerus anatomical neck.

FIG. 15 is a flowchart showing an example method of the disclosure for detecting a humerus anatomical neck. The techniques of FIG. 15 will be described with respect to device 100 of FIG. 1 but are not limited to any particular type of computing device.

Device 100 may be configured to receive a three-dimensional (3D) representation of a humerus (500). Device 100 may further be configured to apply a machine learning model to the three-dimensional representation to determine a segmentation of the 3D representation of the humerus, the segmentation including a first region of the 3D representation of the humerus below the humerus anatomical neck, and a second region of the 3D representation of the humerus above the humerus anatomical neck (502).

In one example, the parameters of the machine learning model are based on a loss function, wherein the loss function is defined by a scalar product of a first mean value of normals of ground truth points above the humerus anatomical neck and a second mean value of normals of predicted points above the humerus anatomical neck. In a more specific example, the loss function is Loss=a cos (N_gt*N_pred), wherein a cos is an inverse cosine function that computes an angle from the scalar product of N_gt and N_pred, wherein N_gt is the first mean value of normals of ground truth points above the humerus anatomical neck in an annotated training 3D representation of the humerus, and wherein N_pred is the second mean value of normals of predicted points above the humerus anatomical neck in a non-annotated 3D representation of the humerus.

In one example, the 3D representation of the humerus is a point cloud, the first region is a first set of points in the point cloud below the humerus anatomical neck, and the second region is a second set of points in the point cloud above the humerus anatomical neck. In another example, the 3D representation of the humerus is a 3D binary image, the first region is a first set of voxels in the 3D binary image below the humerus anatomical neck, and the second region is a second set of voxels in the 3D binary image above the humerus anatomical neck.

Device 100 may be further configured to determine a location of the humerus anatomical neck on the 3D representation of the humerus based on the segmentation (504), and generate a labeled 3D representation of the humerus that indicates the location of the humerus anatomical neck (506).

In one example, to determine the location of the humerus anatomical neck on the 3D representation of the humerus based on the segmentation, device 100 is further configured to: determine a plane through the humerus anatomical neck between the first region and the second region. In some examples, device 100 may further determine a cut location for a shoulder replacement surgery based on the plane through the humerus anatomical neck. The shoulder replacement surgery may be an anatomical shoulder arthroplasty or a reverse should arthroplasty.

Below are other example aspects of the disclosure.

Aspect 1—A computing system configured to determine a location of a humerus anatomical neck, the computing system comprising: a memory configured to store parameters of a machine learning model; and one or more processors in communication with the memory, the one or more processors configured to: receive a three-dimensional (3D) representation of a humerus; apply the machine learning model to the three-dimensional representation to determine a segmentation of the 3D representation of the humerus, the segmentation including a first region of the 3D representation of the humerus below the humerus anatomical neck, and a second region of the 3D representation of the humerus above the humerus anatomical neck; determine a location of the humerus anatomical neck on the 3D representation of the humerus based on the segmentation; and generate a labeled 3D representation of the humerus that indicates the location of the humerus anatomical neck.

Aspect 2—The computing system of Aspect 1, wherein the parameters of the machine learning model are based on a loss function, wherein the loss function is defined by a scalar product of a first mean value of normals of ground truth points above the humerus anatomical neck and a second mean value of normals of predicted points above the humerus anatomical neck.

Aspect 3—The computing system of Aspect 2, wherein the loss function is Loss=acos (N_gt*N_pred), wherein a cos is an inverse cosine function that computes an angle from the scalar product of N_gt and N_pred, wherein N_gt is the first mean value of the normals of ground truth points above the humerus anatomical neck in an annotated training 3D representation of the humerus, and wherein N_pred is the second mean value of the normals of predicted points above the humerus anatomical neck in a non-annotated 3D representation of the humerus.

Aspect 4—The computing system of any of Aspects 1-3, wherein the 3D representation of the humerus is a point cloud, wherein the first region is a first set of points in the point cloud below the humerus anatomical neck, and wherein the second region is a second set of points in the point cloud above the humerus anatomical neck.

Aspect 5—The computing system of any of Aspects 1-3, wherein the 3D representation of the humerus is a 3D binary image, wherein the first region is a first set of voxels in the 3D binary image below the humerus anatomical neck, and wherein the second region is a second set of voxels in the 3D binary image above the humerus anatomical neck.

Aspect 6—The computing system of any of Aspects 1-5, wherein to determine the location of the humerus anatomical neck on the 3D representation of the humerus based on the segmentation, the one or more processors are further configured to: determine a plane through the humerus anatomical neck between the first region and the second region.

Aspect 7—The computing system of Aspect 6, wherein the one or more processors are further configured to: determine a cut location for a shoulder replacement surgery based on the plane through the humerus anatomical neck.

Aspect 8—The computing system of Aspect 7, wherein the shoulder replacement surgery is an anatomical shoulder arthroplasty or a reverse shoulder arthroplasty.

Aspect 9—The computing system of any of Aspects 7 or 8, wherein the one or more processors are further configured to: add an indication of the cut location to the labeled 3D representation of the humerus that indicates the location of the humerus anatomical neck.

Aspect 10—The computing system of any of Aspects 1-9, wherein the machine learning model is a neural network.

Aspect 11—The computing system of Aspect 10, wherein the neural network is a convolutional neural network.

Aspect 12—The computing system of any of Aspects 1-11, further comprising: a display configured to display the labeled 3D representation of the humerus that indicates the location of the humerus anatomical neck.

Aspect 13—The computing system of Aspect 12, wherein the display is a visualization device.

Aspect 14—The computing system of Aspect 13, wherein the visualization device is one of a mixed reality (MR) visualization device, a virtual reality (VR) visualization device, a holographic projector, or an extended reality (XR) visualization device.

Aspect 15—A method for determining a location of a humerus anatomical neck, the method comprising: receiving a three-dimensional (3D) representation of a humerus; applying a machine learning model to the three-dimensional representation to determine a segmentation of the 3D representation of the humerus, wherein the machine learning model operates according to parameters, the segmentation including a first region of the 3D representation of the humerus below the humerus anatomical neck, and a second region of the 3D representation of the humerus above the humerus anatomical neck; determining a location of the humerus anatomical neck on the 3D representation of the humerus based on the segmentation; and generating a labeled 3D representation of the humerus that indicates the location of the humerus anatomical neck.

Aspect 16—The method of Aspect 15, wherein the parameters of the machine learning model are based on a loss function, wherein the loss function is defined by a scalar product of a first mean value of normals of ground truth points above the humerus anatomical neck and a second mean value of normals of predicted points above the humerus anatomical neck.

Aspect 17—The method of Aspect 16, wherein the loss function is Loss=a cos (N_gt*N_pred), wherein a cos is an inverse cosine function that computes an angle from the scalar product of N_gt and N_pred, wherein N_gt is the first mean value of the normals of ground truth points above the humerus anatomical neck in an annotated training 3D representation of the humerus, and wherein N_pred is the second mean value of the normals of predicted points above the humerus anatomical neck in a non-annotated 3D representation of the humerus.

Aspect 18—The method of any of Aspects 15-17, wherein the 3D representation of the humerus is a point cloud, wherein the first region is a first set of points in the point cloud below the humerus anatomical neck, and wherein the second region is a second set of points in the point cloud above the humerus anatomical neck.

Aspect 19—The method of any of Aspects 15-17, wherein the 3D representation of the humerus is a 3D binary image, wherein the first region is a first set of voxels in the 3D binary image below the humerus anatomical neck, and wherein the second region is a second set of voxels in the 3D binary image above the humerus anatomical neck.

Aspect 20—The method of any of Aspects 15-19, wherein determining the location of the humerus anatomical neck on the 3D representation of the humerus based on the segmentation comprises: determining a plane through the humerus anatomical neck between the first region and the second region.

Aspect 21—The method of Aspect 20, further comprising: determining a cut location for a shoulder replacement surgery based on the plane through the humerus anatomical neck.

Aspect 22—The method of Aspect 21, wherein the shoulder replacement surgery is an anatomical shoulder arthroplasty or a reverse shoulder arthroplasty.

Aspect 23—The method of any of Aspects 21 or 22, further comprising: adding an indication of the cut location to the labeled 3D representation of the humerus that indicates the location of the humerus anatomical neck.

Aspect 24—The method of any of Aspects 15-23, wherein the machine learning model is a neural network.

Aspect 25—The method of Aspect 24, wherein the neural network is a convolutional neural network.

Aspect 26—The method of any of Aspects 15-25, further comprising: displaying the labeled 3D representation of the humerus that indicates the location of the humerus anatomical neck.

Aspect 27—The method of Aspect 26, wherein displaying the labeled 3D representation of the humerus that indicates the location of the humerus anatomical neck comprises: displaying the labeled 3D representation of the humerus on a visualization device.

Aspect 28—The method of Aspect 27, wherein the visualization device is one of a mixed reality (MR) visualization device, a virtual reality (VR) visualization device, a holographic projector, or an extended reality (XR) visualization device.

Aspect 29—A non-transitory computer-readable storage medium storing instruction that, when executed, cause one or more processors to: receive a three-dimensional (3D) representation of a humerus; apply a machine learning model to the three-dimensional representation to determine a segmentation of the 3D representation of the humerus, wherein the machine learning model operates according to parameters, the segmentation including a first region of the 3D representation of the humerus below the humerus anatomical neck, and a second region of the 3D representation of the humerus above the humerus anatomical neck; determine a location of the humerus anatomical neck on the 3D representation of the humerus based on the segmentation; and generate a labeled 3D representation of the humerus that indicates the location of the humerus anatomical neck.

Aspect 30—The non-transitory computer-readable storage medium of Aspect 29, wherein the parameters of the machine learning model are based on a loss function, wherein the loss function is defined by a scalar product of a first mean value of normals of ground truth points above the humerus anatomical neck and a second mean value of normals of predicted points above the humerus anatomical neck.

Aspect 31—The non-transitory computer-readable storage medium of Aspect 30, wherein the loss function is Loss=a cos (N_gt*N_pred), wherein a cos is an inverse cosine function that computes an angle from the scalar product of N_gt and N_pred, wherein N_gt is the first mean value of the normals of ground truth points above the humerus anatomical neck in an annotated training 3D representation of the humerus, and wherein N_pred is the second mean value of the normals of predicted points above the humerus anatomical neck in a non-annotated 3D representation of the humerus.

Aspect 32—The non-transitory computer-readable storage medium of any of Aspects 29-31, wherein the 3D representation of the humerus is a point cloud, wherein the first region is a first set of points in the point cloud below the humerus anatomical neck, and wherein the second region is a second set of points in the point cloud above the humerus anatomical neck.

Aspect 33—The non-transitory computer-readable storage medium of any of Aspects 29-31, wherein the 3D representation of the humerus is a 3D binary image, wherein the first region is a first set of voxels in the 3D binary image below the humerus anatomical neck, and wherein the second region is a second set of voxels in the 3D binary image above the humerus anatomical neck.

Aspect 34—The non-transitory computer-readable storage medium of any of Aspects 29-33, wherein to determine the location of the humerus anatomical neck on the 3D representation of the humerus based on the segmentation, the instructions further cause the one or more processors are further configured to: determine a plane through the humerus anatomical neck between the first region and the second region.

Aspect 35—The non-transitory computer-readable storage medium of Aspect 34, wherein the instructions further cause the one or more processors are further configured to: determine a cut location for a shoulder replacement surgery based on the plane through the humerus anatomical neck.

Aspect 36—The non-transitory computer-readable storage medium of Aspect 35, wherein the shoulder replacement surgery is an anatomical shoulder arthroplasty or a reverse shoulder arthroplasty.

Aspect 37—The non-transitory computer-readable storage medium of any of Aspects 35 or 36, wherein the instructions further cause the one or more processors are further configured to: add an indication of the cut location to the labeled 3D representation of the humerus that indicates the location of the humerus anatomical neck.

Aspect 38—The non-transitory computer-readable storage medium of any of Aspects 29-37, wherein the machine learning model is a neural network.

Aspect 39—The non-transitory computer-readable storage medium of Aspect 38, wherein the neural network is a convolutional neural network.

Aspect 40—The non-transitory computer-readable storage medium of any of Aspects 29-39, wherein the instructions further cause the one or more processors are further configured to: display the labeled 3D representation of the humerus that indicates the location of the humerus anatomical neck.

Aspect 41—The non-transitory computer-readable storage medium of Aspect 40, wherein to display the labeled 3D representation of the humerus that indicates the location of the humerus anatomical neck, the instructions further cause the one or more processors to:
display the labeled 3D representation of the humerus on a visualization device.

Aspect 42—The non-transitory computer-readable storage medium of Aspect 41, wherein the visualization device is one of a mixed reality (MR) visualization device, a virtual reality (VR) visualization device, a holographic projector, or an extended reality (XR) visualization device.

While the techniques been disclosed with respect to a limited number of examples, those skilled in the art, having the benefit of this disclosure, will appreciate numerous modifications and variations there from. For instance, it is contemplated that any reasonable combination of the described examples may be performed. It is intended that the appended claims cover such modifications and variations as fall within the true spirit and scope of the invention.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Operations described in this disclosure may be performed by one or more processors, which may be implemented as fixed-function processing circuits, programmable circuits, or combinations thereof, such as one or more digital signal processors (DSPs), general purpose microprocessors, application specific integrated circuits (ASICs), field programmable gate arrays (FPGAs), or other equivalent integrated or discrete logic circuitry. Fixed-function circuits refer to circuits that provide particular functionality and are preset on the operations that can be performed. Programmable circuits refer to circuits that can programmed to perform various

The invention claimed is:

1. A computing system configured to determine a location of a humerus anatomical neck, the computing system comprising:
a memory configured to store parameters of a machine learning model; and
one or more processors in communication with the memory, the one or more processors configured to:
receive a three-dimensional (3D) representation of a humerus;
apply the machine learning model to the 3D representation of the humerus to determine a segmentation of the 3D representation of the humerus, wherein the machine learning model operates according to the parameters, the segmentation including a first region of the 3D representation of the humerus below the humerus anatomical neck, and a second region of the 3D representation of the humerus above the humerus anatomical neck, wherein the parameters of the machine learning model are trained based on a loss function, and wherein the loss function is defined by a scalar product of a first mean value of normals of ground truth points above a representation of a humerus anatomical neck and a second mean value of normals of predicted points above the representation of the humerus anatomical neck;
determine a location of the humerus anatomical neck on the 3D representation of the humerus based on the segmentation; and
generate a labeled 3D representation of the humerus that indicates the location of the humerus anatomical neck.

2. The computing system of claim 1, wherein the loss function is Loss=a cos (N_gt*N_pred), wherein a cos is an inverse cosine function that computes an angle from the scalar product of N_gt and N_pred, wherein N_gt is the first mean value of the normals of ground truth points above the representation of the humerus anatomical neck in an annotated training 3D representation of the humerus, and wherein N_pred is the second mean value of the normals of predicted points above the representation of the humerus anatomical neck in a non-annotated 3D representation of the humerus.

3. The computing system of claim 1, wherein the 3D representation of the humerus is a point cloud, wherein the first region is a first set of points in the point cloud below the humerus anatomical neck, and wherein the second region is a second set of points in the point cloud above the humerus anatomical neck.

4. The computing system of claim 1, wherein the 3D representation of the humerus is a 3D binary image, wherein the first region is a first set of voxels in the 3D binary image below the humerus anatomical neck, and wherein the second region is a second set of voxels in the 3D binary image above the humerus anatomical neck.

5. The computing system of claim 1, wherein to determine the location of the humerus anatomical neck on the 3D representation of the humerus based on the segmentation, the one or more processors are further configured to:
determine a plane through the humerus anatomical neck between the first region and the second region.

6. The computing system of claim 5, wherein the one or more processors are further configured to:
determine a cut location for a shoulder replacement surgery based on the plane through the humerus anatomical neck.

7. The computing system of claim 6, wherein the shoulder replacement surgery is an anatomical shoulder arthroplasty or a reverse shoulder arthroplasty.

8. The computing system of claim 6, wherein the one or more processors are further configured to:
add an indication of the cut location to the labeled 3D representation of the humerus that indicates the location of the humerus anatomical neck.

9. The computing system of claim 1, wherein the machine learning model is a neural network.

10. The computing system of claim 9, wherein the neural network is a convolutional neural network.

11. The computing system of claim 1, further comprising:
a display configured to display the labeled 3D representation of the humerus that indicates the location of the humerus anatomical neck.

12. The computing system of claim 11, wherein the display is a visualization device.

13. The computing system of claim 12, wherein the visualization device is one of a mixed reality (MR) visualization device, a virtual reality (VR) visualization device, a holographic projector, or an extended reality (XR) visualization device.

14. A method for determining a location of a humerus anatomical neck, the method comprising:
receiving a three-dimensional (3D) representation of a humerus;
applying a machine learning model to the 3D representation of the humerus to determine a segmentation of the 3D representation of the humerus, wherein the machine learning model operates according to parameters, the segmentation including a first region of the 3D representation of the humerus below the humerus anatomical neck, and a second region of the 3D representation of the humerus above the humerus anatomical neck, wherein the parameters of the machine learning model are trained based on a loss function, and wherein the loss function is defined by a scalar product of a first mean value of normals of ground truth points above a representation of a humerus anatomical neck and a second mean value of normals of predicted points above the representation of the humerus anatomical neck;
determining a location of the humerus anatomical neck on the 3D representation of the humerus based on the segmentation; and
generating a labeled 3D representation of the humerus that indicates the location of the humerus anatomical neck.

15. The method of claim 14, wherein the loss function is Loss=a cos (N_gt*N_pred), wherein a cos is an inverse cosine function that computes an angle from the scalar product of N_gt and N_pred, wherein N_gt is the first mean value of the normals of ground truth points above the representation of the humerus anatomical neck in an annotated training 3D representation of the humerus, and wherein N_pred is the second mean value of the normals of predicted points above the representation of the humerus anatomical neck in a non-annotated 3D representation of the humerus.

16. The method of claim 14, wherein the 3D representation of the humerus is a point cloud, wherein the first region is a first set of points in the point cloud below the humerus anatomical neck, and wherein the second region is a second set of points in the point cloud above the humerus anatomical neck.

17. The method of claim 14, wherein the 3D representation of the humerus is a 3D binary image, wherein the first region is a first set of voxels in the 3D binary image below the humerus anatomical neck, and wherein the second region is a second set of voxels in the 3D binary image above the humerus anatomical neck.

18. The method of claim 14, wherein determining the location of the humerus anatomical neck on the 3D representation of the humerus based on the segmentation comprises:
   determining a plane through the humerus anatomical neck between the first region and the second region.

19. The method of claim 18, further comprising:
   determining a cut location for a shoulder replacement surgery based on the plane through the humerus anatomical neck.

20. The method of claim 19, wherein the shoulder replacement surgery is an anatomical shoulder arthroplasty or a reverse shoulder arthroplasty.

21. The method of claim 19, further comprising:
   adding an indication of the cut location to the labeled 3D representation of the humerus that indicates the location of the humerus anatomical neck.

22. The method of claim 14, wherein the machine learning model is a neural network.

23. The method of claim 22, wherein the neural network is a convolutional neural network.

24. The method of claim 14, further comprising:
   displaying the labeled 3D representation of the humerus that indicates the location of the humerus anatomical neck.

25. The method of claim 24, wherein displaying the labeled 3D representation of the humerus that indicates the location of the humerus anatomical neck comprises:
   displaying the labeled 3D representation of the humerus on a visualization device.

26. The method of claim 25, wherein the visualization device is one of a mixed reality (MR) visualization device, a virtual reality (VR) visualization device, a holographic projector, or an extended reality (XR) visualization device.

27. A computing system configured to determine a location of a humerus anatomical neck, the computing system comprising:
   a memory configured to store parameters of a machine learning model; and
   one or more processors in communication with the memory, the one or more processors configured to:
      receive a three-dimensional (3D) representation of a humerus;
      apply the machine learning model to the 3D representation of the humerus to determine a segmentation of the 3D representation of the humerus, wherein the machine learning model operates according to the parameters, the segmentation including a first region of the 3D representation of the humerus below the humerus anatomical neck, and a second region of the 3D representation of the humerus above the humerus anatomical neck, wherein the 3D representation of the humerus is a 3D binary image, wherein the first region is a first set of voxels in the 3D binary image below the humerus anatomical neck, and wherein the second region is a second set of voxels in the 3D binary image above the humerus anatomical neck;
      determine a location of the humerus anatomical neck on the 3D representation of the humerus based on the segmentation; and
      generate a labeled 3D representation of the humerus that indicates the location of the humerus anatomical neck.

28. The computing system of claim 27, wherein the parameters of the machine learning model are trained based on a loss function, and wherein the loss function is defined by a scalar product of a first mean value of normals of ground truth points above a representation of a humerus anatomical neck and a second mean value of normals of predicted points above the representation of the humerus anatomical neck.

29. The computing system of claim 27, wherein to determine the location of the humerus anatomical neck on the 3D representation of the humerus based on the segmentation, the one or more processors are further configured to:
   determine a plane through the humerus anatomical neck between the first region and the second region.

30. The computing system of claim 29, wherein the one or more processors are further configured to:
   determine a cut location for a shoulder replacement surgery based on the plane through the humerus anatomical neck; and
   add an indication of the cut location to the labeled 3D representation of the humerus that indicates the location of the humerus anatomical neck.

* * * * *